(12) United States Patent
Okamura

(10) Patent No.: US 7,723,945 B2
(45) Date of Patent: May 25, 2010

(54) CONTROL DEVICE FOR MOTOR DRIVE SYSTEM AND ELECTRIC VEHICLE INCLUDING THE SAME

(75) Inventor: Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 372 days.

(21) Appl. No.: 11/919,739

(22) PCT Filed: May 1, 2006

(86) PCT No.: PCT/JP2006/309442

§ 371 (c)(1),
(2), (4) Date: Nov. 1, 2007

(87) PCT Pub. No.: WO2006/121093

PCT Pub. Date: Nov. 16, 2006

(65) Prior Publication Data

US 2008/0218111 A1 Sep. 11, 2008

(30) Foreign Application Priority Data

May 10, 2005 (JP) .............................. 2005-137063

(51) Int. Cl.
*H02P 21/00* (2006.01)
*H02P 27/08* (2006.01)
(52) U.S. Cl. ........................ 318/805; 318/801; 318/811
(58) Field of Classification Search ................. 318/453, 318/465, 700, 701, 705, 721, 722, 800, 801, 318/805, 811, 599

See application file for complete search history.

(56) References Cited

U.S. PATENT DOCUMENTS

| | | | |
|---|---|---|---|
| 6,121,736 A * | 9/2000 | Narazaki et al. | 318/400.35 |
| 6,388,416 B1 * | 5/2002 | Nakatani et al. | 318/700 |
| 6,674,262 B2 * | 1/2004 | Kitajima et al. | 318/722 |
| 6,936,991 B2 * | 8/2005 | Chen et al. | 318/700 |
| 7,161,323 B2 * | 1/2007 | Ajima et al. | 318/629 |

(Continued)

FOREIGN PATENT DOCUMENTS

EP 0 536 569 A2 4/1993

(Continued)

OTHER PUBLICATIONS

Monozukuri, Nikkei, "Toyota's Motor Control Technology Achieving Balance Between Ecology and Power," p. 89-95, (Aug. 2004).—Translation-.

*Primary Examiner*—Walter Benson
*Assistant Examiner*—Eduardo Colon-Santana
(74) *Attorney, Agent, or Firm*—Oliff & Berridge, PLC

(57) ABSTRACT

A square wave voltage having an amplitude equal to an output voltage of a converter is applied to an AC motor by a square wave control block. Torque control of the AC motor is performed basically by changing the voltage phase of the square wave voltage according to the torque deviation. When the motor revolution is suddenly changed, a instruction value correction unit sets a voltage instruction value of the output voltage of the converter according to a change ratio of the motor revolutions. This improves control of the motor current by changing the voltage applied to the motor in accordance with the sudden change of the motor revolutions without waiting for torque feedback control having a low control response.

18 Claims, 14 Drawing Sheets

U.S. PATENT DOCUMENTS

| | | | | |
|---|---|---|---|---|
| 7,402,975 | B2* | 7/2008 | Takata et al. | 318/727 |
| 2004/0201358 | A1* | 10/2004 | Kawaji et al. | 318/701 |
| 2004/0232865 | A1* | 11/2004 | Suzuki | 318/439 |
| 2006/0125439 | A1* | 6/2006 | Ajima et al. | 318/716 |
| 2008/0298784 | A1* | 12/2008 | Kastner | 388/811 |
| 2009/0190903 | A1* | 7/2009 | Komatsu et al. | 388/803 |
| 2009/0248230 | A1* | 10/2009 | Izumi et al. | 701/22 |

FOREIGN PATENT DOCUMENTS

| | | |
|---|---|---|
| JP | A 01-097102 | 4/1989 |
| JP | A 05-083976 | 4/1993 |
| JP | A 09-215398 | 8/1997 |
| JP | A 11-285288 | 10/1999 |
| JP | A 2000-050689 | 2/2000 |
| JP | A 2000-358393 | 12/2000 |
| JP | A 2002-354873 | 12/2002 |
| JP | A 2003-054892 | 2/2003 |
| JP | A 2003-088157 | 3/2003 |
| JP | A 2003-309997 | 10/2003 |
| JP | A 2004-072954 | 3/2004 |
| JP | A 2004-166415 | 6/2004 |
| JP | A 2005-051894 | 2/2005 |
| WO | WO 2005/013473 A1 | 2/2005 |

* cited by examiner

FIG.2

| CONTROL METHOD | I. SINUSOIDAL PWM | II. OVERMODULATION PWM | III. RECTANGULAR WAVE (1 PULSE) |
|---|---|---|---|
| | MAXIMUM TORQUE CONTROL | | FIELD WEAKENING CONTROL |
| VOLTAGE WAVEFORM OF INVERTER OUTPUT | FUNDAMENTAL COMPONENT | FUNDAMENTAL COMPONENT | FUNDAMENTAL COMPONENT |
| MODULATION RATE | 0~0.61 | 0.61~0.78 | 0.78 |
| CHARACTERISTICS | SMALL TORQUE VARIATION | IMPROVED OUTPUT IN MID-SPEED RANGE | IMPROVED OUTPUT IN HIGH-SPEED RANGE |

FIG.3

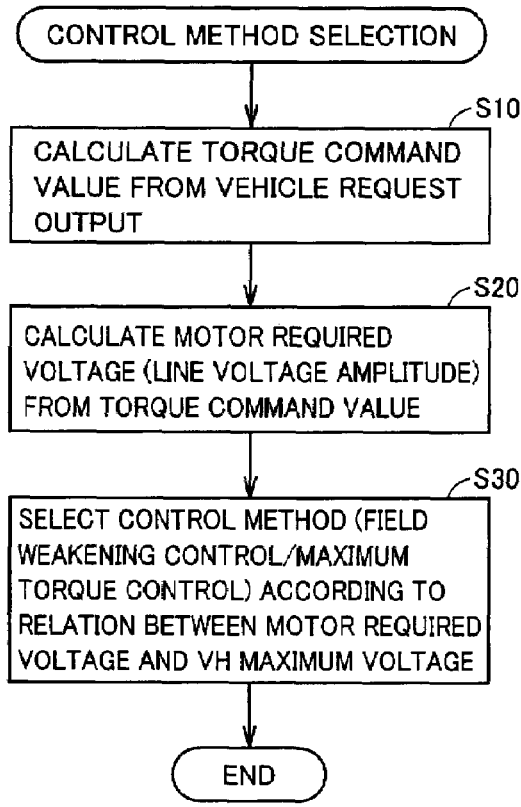

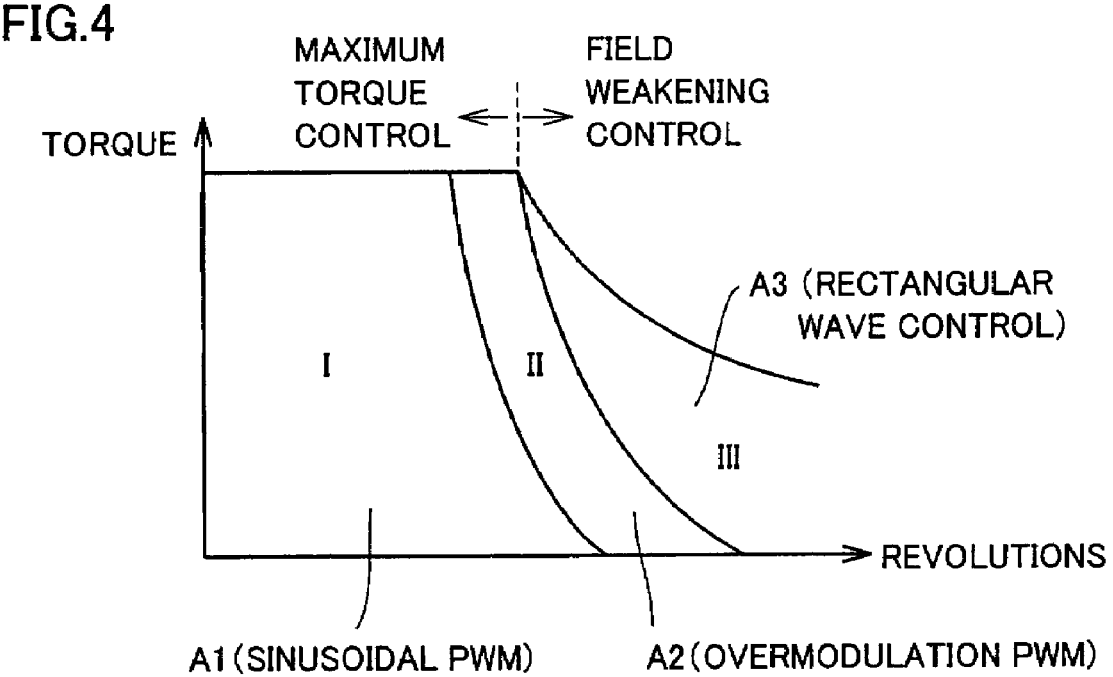

US 7,723,945 B2

CONTROL DEVICE FOR MOTOR DRIVE SYSTEM AND ELECTRIC VEHICLE INCLUDING THE SAME

TECHNICAL FIELD

The present invention relates to a control device for a motor drive system and an electric vehicle including the same, and more particularly to a control device for a motor drive system converting DC voltage into AC voltage by an inverter to be applied to an AC motor.

BACKGROUND ART

A motor drive system is generally used which converts DC voltage into AC voltage by an inverter to drive and control an AC motor. In such a motor drive system, generally, motor current is controlled according to sinusoidal PWM (Pulse Width Modulation) control based on vector control for driving an AC motor with high efficiency.

However, in the sinusoidal PWM control method, a fundamental component of an output voltage of the inverter cannot be increased enough and voltage utilization is limited, so that it is difficult to obtain a high power in a high rotational speed region. In consideration of this point, employment of a modulation method that allows outputting a voltage with a fundamental component larger than the sinusoidal PWM control method has been proposed.

For example, Japanese Patent Laying-Open No. 2000-50689 (Patent Document 1) proposes that, in a control configuration in which, for output power improvement in a high speed range, rectangular wave voltage is applied to an AC motor to rotate and drive this AC motor (also referred to as "rectangular wave control method" hereinafter), torque control of AC electric motor is performed by controlling the phase of this rectangular wave voltage based on a deviation between a torque command value and actual torque.

Furthermore, such a configuration is disclosed in that a motor drive system additionally employing "overmodulation PWM control method" using an intermediate voltage waveform between the rectangular wave control method and the sinusoidal PWM control method is adopted to a hybrid automobile (for example, "Toyota's Motor Control Technology Achieving Balance Between Ecology and Power," Nikkei Monozukuri, August 2004, p. 89-95). This motor drive system uses the three control methods, namely, the sinusoidal PWM control, the overmodulation PWM control and the rectangular wave control method, which are appropriately switched depending on the motor operation condition (typically, torque/revolutions).

In addition, such a configuration is disclosed in that, considering that when an output voltage of an inverter is saturated in motor current feedback control, a harmonic also superimposes on current flowing in a motor, motor current feedback control is performed after a harmonic component is removed from the detected motor current by a filter operation portion (for example, Japanese Patent Laying-Open No. 9-215398: Patent Document 2).

Here, in the modulation method in which a fundamental component of an inverter output voltage is larger than in the sinusoidal PWM control method, typically, in the rectangular wave control method and the overmodulation control method as described above, while output power can be improved in a mid-speed range and a high-speed range of an AC motor, control response is degraded as compared with the sinusoidal PWM control method, because the voltage waveform of the motor applied voltage is distorted.

This is because, in the rectangular wave control method, an operation amount is only a phase of motor applied voltage (rectangular wave voltage) and therefore the controllability is degraded as compared with the sinusoidal PWM control method which can employ both the amplitude and the phase of the applied voltage as the operation amount. In addition, a distortion component of motor current is greater because of a greater distortion in the motor applied voltage waveform. This requires filter processing similar to that in the aforementioned Patent Document 2 (for example, time constant: about a few tens of milliseconds), and also in this respect, a control delay occurs.

Furthermore, even in the overmodulation control method, a distortion component of motor current is greater similarly, and the controllability is degraded by the aforementioned filter processing, as compared with the sinusoidal PWM control method.

Therefore, in such a modulation method like the rectangular wave control method and the overmodulation control method in which a fundamental component of an inverter output voltage is larger than in the sinusoidal PWM control method, the control response of the motor applied voltage is delayed at a time of a sudden change of motor revolutions (which means revolutions per unit time and is synonymous with rotational speed. The same applies hereinafter), so that motor current is likely to be disturbed. In particular, if motor current is disturbed so as to diverge in the increasing direction, overcurrent/overvoltage is generated, which may lead to inconvenience such as system shutdown or equipment destruction. In addition, if the rating (withstand voltage, current capacity, and the like) of the system component is designed to excessively respond to the likelihood of overvoltage/overcurrent resulting from the degraded control response as described above, the manufacturing costs are increased.

DISCLOSURE OF THE INVENTION

The present invention is made to solve the aforementioned problems and an object of the present invention is to appropriately control motor current at a time of a sudden change of an AC motor revolutions in a control device for a motor drive system which controls an AC motor according to a modulation method in which a fundamental component of an inverter output voltage (motor applied voltage) is larger than the sinusoidal PWM control method.

A control device for a motor drive system in accordance with the present invention controls a motor drive system including an inverter converting DC voltage into AC voltage for driving an AC motor. The control device includes a current detection portion, a rotational speed detection portion, a control method selection portion, a first motor control portion, a second motor control portion, a rotational speed change occurrence detection portion, and a motor voltage correction portion. The current detection portion detects motor current supplied to the AC motor. The rotational speed detection portion detects a rotational speed of the AC motor. The control method selection portion selectively sets a control method of voltage conversion in the inverter, depending on an operation condition of the AC motor. The first motor control portion performs torque control based on the motor current detected by the current detection portion, when the control method selection portion selects a first control method in which an applied voltage to the AC motor is controlled according to a sinusoidal pulse width modulation method by vector control. The second motor control portion performs torque control based on the motor current detected by the current detection portion, when the control method selection portion selects a second control method in which the applied voltage to the AC motor is controlled according to a modulation method of outputting a voltage with a fundamental component larger than the sinusoidal pulse width modulation method. The rotational speed change occurrence detection portion detects that a rotational speed change of a prescribed value or greater occurs in the AC motor, during selection of the second control method, based on an output of the rotational speed detection portion. When occurrence of a rotational speed change of the prescribed value or greater is detected by the rotational speed change occurrence detection portion, the motor voltage correction portion corrects the applied voltage to the AC motor by the second motor control portion depending on the rotational speed change.

An electric vehicle in accordance with the present invention includes an AC motor configured to generate torque for driving a drive wheel, a motor drive system configured to include an inverter converting DC voltage into AC voltage for driving the AC motor, and a control device for controlling the motor drive system. The control device includes a current detection portion, a rotational speed detection portion, a control method selection portion, a first motor control portion, a second motor control portion, a rotational speed change occurrence detection portion, and a motor voltage correction portion. The current detection portion detects motor current supplied to the AC motor. The rotational speed detection portion detects a rotational speed of the AC motor. The control method selection portion selectively sets a control method of the voltage conversion in the inverter, depending on an operation condition of the AC motor. The first motor control portion performs torque control based on the motor current detected by the current detection portion, when the control method selection portion selects a first control method in which an applied voltage to the AC motor is controlled according to a sinusoidal pulse width modulation method by vector control. The second motor control portion performs torque control based on the motor current detected by the current detection portion, when the control method selection portion selects a second control method in which the applied voltage to the AC motor is controlled according to a modulation method of outputting a voltage with a fundamental component larger than the sinusoidal pulse width modulation method. The rotational speed change occurrence detection portion detects that a rotational speed change of a prescribed value or greater occurs in the AC motor, during selection of the second control method, based on an output of the rotational speed detection portion. When occurrence of a rotational speed change of the prescribed value or greater is detected by the rotational speed change occurrence detection portion, the motor voltage correction portion corrects the applied voltage to the AC motor by the second motor control portion depending on the rotational speed change.

According to the control device for a motor drive system and the electric vehicle as described above, in a case where the AC motor is controlled according to the modulation method (typically, the overmodulation PWM control method and the rectangular wave control method) in which a voltage with a fundamental component larger than the sinusoidal pulse width modulation method is output, when the rotational speed (revolutions per unit time) of the AC motor, which is a control target, suddenly changes, the applied voltage to the AC motor can be corrected depending on the rotational speed change that has occurred. Therefore, even if a control delay takes place in the feedback control by the second control method based on detection of motor current of the AC motor, correction control can be performed depending on the rotational speed change of the AC motor. As a result, the motor current is controlled appropriately at a time of a sudden change of the rotational speed of the AC motor, thereby preventing excessive motor current. Thus, the system components are protected, and in addition, the safety degree concerning the design of the rating (withstand voltage, current capacity, and the like) of these components can be reduced, thereby contributing to reduction of the manufacturing costs.

Preferably, in the control device for a motor drive system in accordance with the present invention, the motor drive system further includes a converter variably controlling a level of the DC voltage input to the inverter according to a voltage command value. Furthermore, the motor voltage correction portion is configured, when occurrence of a rotational speed change of the prescribed value or greater is detected by the rotational speed change occurrence detection portion, to set the voltage command value of the converter depending on the rotational speed change.

According to the control device for a motor drive system as described above, in the configuration in which a voltage level of the input voltage to the inverter can be variably controlled, at a time of rotation change of the AC motor, the input voltage to the inverter is corrected depending on the rotational speed change that has occurred, so that the applied voltage to the AC motor can be increased or decreased in such a direction in that a control delay by the second control method (the overmodulation PWM control or the rectangular wave control method) is prevented. Thus, an increase of the motor current at a time of motor rotational speed sudden change can be prevented.

Preferably, in the control device for a motor drive device in accordance with present invention, the second motor control portion includes a rectangular wave control portion. The rectangular wave control portion controls switching of the inverter such that a rectangular wave voltage having as an amplitude the DC voltage input to the inverter is applied to the AC motor and the rectangular wave voltage has a phase corresponding to a torque deviation from a torque command value. Furthermore, the motor voltage correction portion is configured, when a rotational speed decrease of the prescribed value or greater is detected by the rotational speed change occurrence detection portion, to control switching of the inverter such that a duty ratio corresponding to the rotational speed change is forcedly provided in the rectangular wave voltage.

According to the control device for a motor drive system as described above, in the rectangular wave control method, if the rotational speed of the AC motor suddenly decreases, the duty ratio is forcedly provided in the rectangular wave voltage applied to the AC voltage, so that the applied voltage to the AC motor can be decreased depending on the rotational speed decrease of the AC motor. This prevents overcurrent generated by a control delay in the rectangular wave control method at a time of a rotational speed sudden decrease of the AC motor.

Preferably, in the control device for a motor drive system in accordance with the present invention, the second motor control portion includes a calculation portion and a pulse width modulation portion. The calculation portion generates a voltage command value of the applied voltage to the AC motor depending on a deviation of the motor current from a current command value corresponding to the torque command value. The pulse width modulation portion controls switching of the inverter according to the voltage command value. Furthermore, the motor voltage correction portion is configured, when occurrence of a rotational speed change of the prescribed value or greater is detected by the rotational speed change occurrence detection portion, to correct the voltage command value generated by the calculation portion depending on the rotational speed change and transmitting the corrected voltage command value to the pulse width modulation portion.

According to the control device for a motor drive system as described above, in the overmodulation PWM control method, if the rotational speed of the AC motor drastically varies, the voltage command value (d-axis voltage, q-axis voltage) is corrected, so that the applied voltage to the AC motor can be increased or decreased in such a direction in that a control delay by the overmodulation PWM control is prevented. This prevents overcurrent generated by a control delay in the overmodulation PWM control method at a time of a rotational speed sudden change of the AC motor.

Preferably, in the control device for a motor drive system in accordance with the present invention, the motor voltage correction portion sets a correction degree of the applied voltage to the AC motor for the rotational speed change at a time of a rotational speed decrease of the AC motor to be larger than the correction degree at a time of a rotational speed increase of the AC motor.

According to the control device for the motor drive system as described above, at a time of motor rotational speed sudden decrease when the motor current is disturbed in the excessively increasing direction in terms of the characteristics of the AC motor, overcurrent resulting from a delay in the motor current control can be prevented effectively.

According to the control device for a motor drive system and the electric vehicle including the same in accordance with the present invention, in the motor control according to the modulation method in which a fundamental component of the inverter output voltage (motor applied voltage) is larger than in the sinusoidal PWM control method, the motor current can be controlled appropriately at a time of a sudden change of the revolutions (rotational speed) of the AC motor (for example, at a time of sudden change of the motor revolutions for generating vehicle drive force when slippage or grip occurs during traveling of the electric vehicle).

BRIEF DESCRIPTION OF THE DRAWINGS

FIG. 2 is a diagram illustrating a control method used in the motor drive system in accordance with an embodiment of the present invention.

FIG. 3 is a flowchart illustrating a control method selecting technique.

FIG. 4 is a diagram illustrating switching of the control methods corresponding to motor conditions.

BEST MODES FOR CARRYING OUT THE INVENTION

Figure 1:
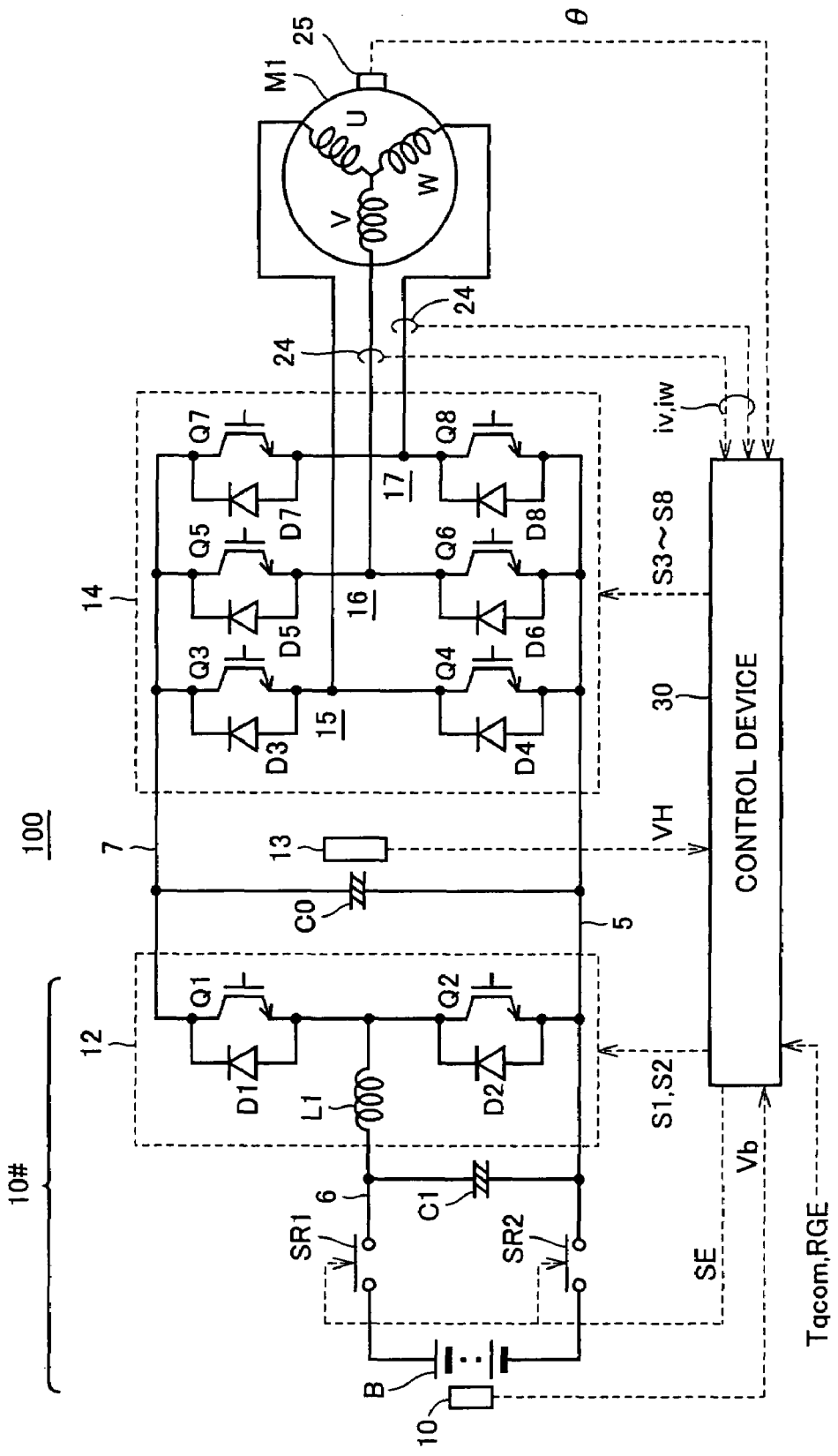
FIG. 1 is an entire configuration diagram of a motor drive system in accordance with an embodiment of the present invention.

In the following, the embodiments of the present invention will be described in detail with reference to the figures. It is noted that in the following the same or corresponding parts in the figures are denoted with the same reference characters and the description is not basically repeated.

First Embodiment

FIG. 1 is an entire configuration diagram of a motor drive system in accordance with an embodiment of the present invention.

Referring to FIG. 1, a motor drive system 100 in accordance with an embodiment of the present invention includes a DC voltage generation portion 10#, a smoothing capacitor C0, an inverter 14, and an AC motor M1.

AC motor M1 is, for example, a driving electric motor generating torque for driving drive wheels mounted on an electric vehicle such as a hybrid car or an electric car. Alternatively, this AC motor M1 may be configured to have a function of a power generator driven by an engine and may be configured to have both functions of an electric motor and a power generator. Furthermore, AC motor M1 may be built in a hybrid car as operating as an electric motor for an engine and being capable of engine start-up, for example.

DC voltage generation portion 10# includes a DC power supply B, system relays SR1, SR2, a smoothing capacitor C1, and a step-up/down converter 12.

DC power supply B is formed of a nickel metal hydride or lithium ion secondary battery, a fuel cell, or a combination of them. DC voltage Vb output by DC power supply B is sensed by a voltage sensor 10. Voltage sensor 10 outputs the detected DC voltage Vb to a control device 30.

System relay SR1 is connected between a positive electrode terminal of DC power supply B and a power line 6, and system relay SR2 is connected between a negative electrode terminal of DC power supply B and a ground line 5. System relays SR1, SR2 are turned on/off by a signal SE from control device 30. More specifically, system relays SR1, SR2 are turned on by signal SE at H (logic high) level from control device 30 and turned off by signal SE at L (logic low) level from control device 30. Smoothing capacitor C1 is connected between power line 6 and ground line 5.

Step-up/down converter 12 includes a reactor L1, power semiconductor switching elements Q1, Q2, and diodes D1, D2.

Power switching elements Q1 and Q2 are connected in series between a power line 7 and ground line 5. The on/off of power switching elements Q1 and Q2 is controlled by switching control signals S1 and S2 from control device 30.

In the embodiments of the present invention, an IGBT (Insulated Gate Bipolar Transistor), a power MOS (Metal Oxide Semiconductor) transistor, a power bipolar transistor, or the like may be used as the power semiconductor switching element (simply referred to as "switching element" hereinafter). Antiparallel diodes D1, D2 are arranged for switching elements Q1, Q2.

Reactor L1 is connected between a connection node of switching elements Q1 and Q2 and power line 6. Furthermore, smoothing capacitor C0 is connected between power line 7 and ground line 5.

Inverter 14 is formed of a U-phase arm 15, a V-phase arm 16 and a W-phase arm 17 provided in parallel between power line 7 and ground line 5. Each phase arm is formed of switching elements connected in series between power line 7 and ground line 5. For example, U-phase arm 15 is formed of switching elements Q3, Q4, V-phase arm 16 is formed of switching elements Q5, Q6, and W-phase arm 17 is formed of switching elements Q7, Q8. In addition, antiparallel diodes D3-D8 are respectively connected to switching elements Q3-Q8. The on/off of switching elements Q3-Q8 is controlled by switching control signals S3-S8 from control device 30.

An intermediate point of each phase arm is connected to each phase end of each phase coil of AC motor M1. In other words, AC motor M1 is a three-phase permanent magnet motor and is formed such that one ends of three, U, V, W-phase coils are commonly connected to a neutral point. Furthermore, the other end of each phase coil is connected to the intermediate point of the switching element of each phase arm 15-17.

At a time of voltage increasing operation, step-up/down converter 12 supplies to inverter 14 DC voltage (this DC voltage equivalent to an input voltage to inverter 14 is also referred to as "system voltage" hereinafter) generated by increasing DC voltage Vb supplied from DC power supply B. More specifically, the ON period of switching element Q1 and the ON period of Q2 are alternately provided in response to switching control signals S1, S2 from control device 30, and the step-up ratio depends on the ratio between these ON periods.

In addition, at a time of voltage decreasing operation, step-up/down converter 12 decreases the DC voltage (system voltage) supplied from inverter 14 through smoothing capacitor C0 to charge DC power supply B. More specifically, the period during which only switching element Q1 is turned on and the period during which both switching elements Q1, Q2 are turned off are alternately provided in response to switching control signals S1, S2 from control device 30, and the step-down ratio depends on the duty ratio of the aforementioned ON period.

Smoothing capacitor C0 smoothes the DC voltage from step-up/down converter 12 and supplies the smoothed DC voltage to inverter 14. A voltage sensor 13 detects the voltage between the opposite ends of smoothing capacitor C0, that is, the system voltage and outputs the detected value VH to control device 30.

If a torque command value of AC motor M1 is positive (Tqcom>0), when DC voltage is supplied from smoothing capacitor C0, inverter 14 converts the DC voltage into an appropriate motor applied voltage (AC voltage) by the switching operation of switching elements Q3-Q8 responsive to switching control signals S3-S8 from control device 30 and drives AC motor M1 so that positive torque is output. On the other hand, if the torque command value of AC motor M1 is zero (Tqcom=0), inverter 14 converts the DC voltage into an appropriate motor applied voltage (AC voltage) by the switching operation responsive to switching control signals S3-S8 and drives AC motor M1 so that torque becomes zero. Thus, AC motor M1 is driven to generate zero or positive torque designated by torque command value Tqcom.

Furthermore, at a time of regenerative braking of the hybrid car or the electric car equipped with motor drive system 100, torque command value Tqcom of AC motor M1 is set negative (Tqcom<0). In this case, inverter 14 converts the AC voltage generated by AC motor M1 into DC voltage by the switching operation responsive to switching control signals S3-S8 and supplies the converted DC voltage (system voltage) to step-up/down converter 12 through smoothing capacitor C0. It is noted that regenerative braking referred to herein includes braking involving regenerative power generation in a case where the foot brake pedal is operated by the driver driving the hybrid car or the electric car, and decelerating a vehicle (or halting acceleration) while regenerative power generation is caused by lifting off the accelerator pedal during travel although the foot brake pedal is not operated.

A current sensor 24 detects motor current flowing in AC motor MC1 and outputs the detected motor current to control device 30. Here, since the sum of instantaneous values of three phase current iu, iv, iw is zero, current sensor 24 may be arranged to only detect motor current of two phases (for example, V-phase current iv and W-phase current iw), as shown in FIG. 1.

A rotational angle sensor (resolver) 25 detects a rotor rotational angle θ of AC motor M1 and sends the detected rotational angle θ to control device 30. In control device 30, the revolutions (rotational speed) of AC motor M1 is calculated based on rotational angle θ.

Control device 30 controls the operations of step-up/down converter 12 and inverter 14 such that AC motor M1 outputs torque according to torque command value Tqcom by the method described later, based on torque command value Tqcom input from an electronic control unit (ECU) provided outside, battery voltage Vb detected by voltage sensor 10, system voltage VH detected by voltage sensor 13, motor currents iv, iw from current sensor 24, and rotational angle θ from rotational angle sensor 25. In other words, switching control signals S1-S8 for controlling step-up/down converter 12 and inverter 14 as described above are generated and output to step-up/down converter 12 and inverter 14.

At a time of voltage increasing operation of step-up/down converter 12, control device 30 feedback-controls output voltage VH of smoothing capacitor C0 and generates switching control signals S1, S2 so that output voltage VH attains a voltage command value.

In addition, control device 30 receives from external ECU a signal RGE indicating that the hybrid car or the electric car enters the regenerative braking mode to generate switching control signals S3-S8 and output the same to inverter 14 so that the AC voltage generated by AC motor M1 is converted into DC voltage. Thus, inverter 14 converts the AC voltage generated in AC motor M1 into DC voltage to be supplied to step-up/down converter 12.

In addition, control device 30 receives from external ECU signal RGE indicating that the hybrid car or the electric car enters the regenerative braking mode to generate switching control signals S1, S2 and output the same to step-up/down converter 12 so that the DC voltage supplied from inverter 14 is decreased. Thus, the AC voltage generated by AC motor M1 is converted into DC voltage and decreased to be supplied to DC power supply B.

Furthermore, control device 30 generates signal SE for turning on/off system relays SR1, SR2 and outputs the same to system relays SR1, SR2.

Now, power conversion in inverter 14 which is controlled by control device 30 will be described in detail.

As shown in FIG. 2, in motor drive system 100 in accordance with the embodiment of the present invention, for motor control, more specifically, power conversion in inverter 14, three control methods are used in a switched manner.

The sinusoidal PWM control method is used as general PWM control, in which the on/off of the switching element in each phase arm is controlled according to voltage comparison between a sine wave-like voltage command value and a carrier wave (typically, a triangular wave). As a result, for a set of a high-level period corresponding to the ON period of the upper arm element (Q3, Q5, Q7 in FIG. 1) and a low-level period corresponding to the ON period of the lower arm element (Q4, Q6, Q8 in FIG. 1), the duty ratio is controlled such that the fundamental component becomes a sine wave within a certain period. As well known, in the sinusoidal PWM control method, this fundamental component amplitude can only be increased 0.61 times of that of the inverter input voltage.

On the other hand, in the rectangular wave control method, one pulse of a rectangular wave with the ratio between a high-level period and a low-level period 1:1 is applied to the AC motor. Thus, the modulation rate can be increased up to 0.78.

In the overmodulation PWM control method, the PWM control similar to the aforementioned sinusoidal PWM control method is performed with the amplitude of a carrier wave distorted to be reduced. As a result, a fundamental component can be distorted and the modulation rate can be increased to the range of 0.61-0.78.

In AC motor M1, inductive voltage becomes higher and its required voltage becomes higher with increasing revolutions and output torque. The increased voltage by converter 12, that is, system voltage VH has to be set higher than this motor required voltage (inductive voltage). On the other hand, the increased voltage by converter 12, that is, the system voltage has a limit value (VH maximum voltage).

Therefore, in a region where the motor required voltage (inductive voltage) is lower than the maximum value of the system voltage (VH maximum voltage), the maximum torque control by the sinusoidal PWM control method or the overmodulation PWM control method is applied, and the output torque is controlled to torque command value Tqcom by the motor current control according to vector control.

On the other hand, when the motor required voltage (inductive voltage) reaches the maximum value of the system voltage (VH maximum voltage), the rectangular wave control method according to field weakening control is applied with system voltage VH being kept. In the rectangular wave control method, as the amplitude of the fundamental component is fixed, torque control is executed by voltage phase control of a rectangular wave pulse based on a deviation between a torque actual value obtained by power calculation and a torque command value.

As shown in the flowchart in FIG. 3, torque command value Tqcom of AC motor M1 is calculated from a vehicle request output based on an accelerator opening degree and the like by the not-shown ECU (step S1). In response, control device 30 calculates motor required voltage (inductive voltage) from torque command value Tqcom and revolutions of AC motor M1 based on a predetermined map or the like (step S20). In addition, according to the relation between the motor required voltage and the maximum value of the system voltage (VH maximum voltage), which of the field weakening control (rectangular wave control method) and the maximum torque control (sinusoidal PWM control method/overmodulation PWM control method) is applied for motor control is determined (step S30). When the maximum torque control is applied, which of the sinusoidal PWM control method and the overmodulation PWM control method is used is determined depending on the modulation rate range of the voltage command value according to vector control. According to the control flow as described above, the proper control method is selected from a plurality of control methods shown in FIG. 2 according to the operation conditions of AC motor M1.

As a result, as shown in FIG. 4, the sinusoidal PWM control method is used to reduce torque variations in a low-speed range A1, the overmodulation PWM control method is applied in a mid-speed range A2, and the rectangular wave control method is applied in a high-speed range A3. In particular, the application of the overmodulation PWM control method and the rectangular wave control method realizes output power improvement of AC motor M1. In this manner, which of the control methods shown in FIG. 2 is used is determined within the range of the feasible modulation rate.

Figure 5:
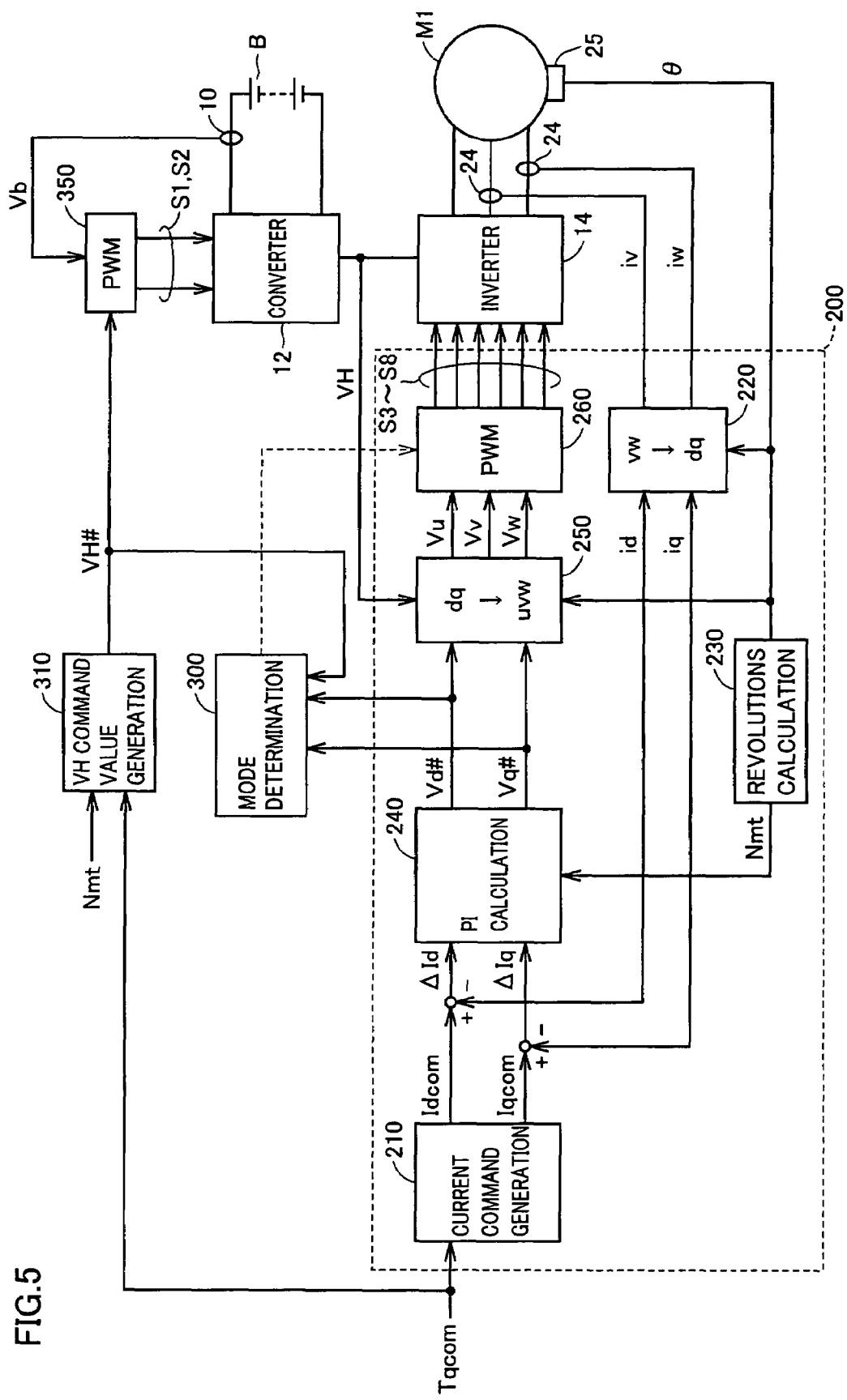
FIG. 5 is a control block diagram in the sinusoidal PWM control method and the overmodulation PWM control method.

FIG. 5 is a control block diagram in the sinusoidal PWM control method and the overmodulation PWM control method executed in control device 30. It is noted that the control block diagram shown in FIG. 5 is implemented by a control calculation process according to a prescribed program executed by control device 30.

Referring to FIG. 5, a PWM control block 200 includes a current command generation portion 210, a coordinate transformation portions 220, 250, a revolutions calculation portion 230, a PI calculation portion 240, and a PWM signal generation portion 260.

Current command generation portion 210 generates a d-axis current command value Idcom and a q-axis current command value Iqcom corresponding to torque command value Tqcom of AC motor M1, according to a table created beforehand, or the like.

Coordinate transformation portion 220 calculates d-axis current id and q-axis current iq, based on v-phase current iv and W-phase current iv detected by current sensor 24, by coordinate transformation (three phases→two phases) using rotational angle θ of AC motor M1 detected by rotational angle sensor 25. Revolutions calculation portion 230 calculates revolutions Nmt of AC motor M1 based on the output from rotational angle sensor 25.

PI calculation portion 240 receives a deviation ΔId from a command value of d-axis current (ΔId=Idcom−id) and a deviation ΔIq from a command value of q-axis current (ΔIq=Iqcom−iq). PI calculation portion 240 performs PI calculation by a prescribed gain to obtain a control deviation for each of d-axis current deviation ΔId and q-axis current deviation ΔIq and generates d-axis voltage command value Vd# and q-axis voltage command value Vq# corresponding to this control deviation.

Coordinate transformation portion 250 converts d-axis voltage command value Vd# and q-axis voltage command value Vq# into each phase voltage command values Vu, Vv, Vw of U phase, V phase, W phase by coordinate transformation (two phases→three phases) using rotational angle θ of AC motor M1. Here, system voltage VH is also reflected in the conversion from d-axis, q-axis voltage command values Vd#, Vq# into each phase voltage command values Vu, Vv, Vw.

PWM signal generation portion 260 generates switching control signals S3-S8 shown in FIG. 1 based on the comparison between voltage command value Vu, Vv, Vw in each phase and a prescribed carrier wave. The switching of inverter 14 is controlled according to switching control signals S3-S8 generated by PWM control block 200, so that AC voltage for outputting torque according to torque command value Tqcom is applied to AC motor M1. Here, as described above, at a time of overmodulation PWM control method, the carrier wave used in the PWM modulation in PWM signal generation portion 260 is switched from the general one in the sinusoidal PWM control method.

In the motor drive system control system in accordance with the embodiment of the present invention, a control mode determination portion 300, a VH command value generation portion 310, and a PWM signal generation portion 350 are further provided.

Control mode determination portion 300 selects one of the sinusoidal PWM control method and the overmodulation PWM control method according the modulation rate calculation shown below, when the maximum torque control (sinusoidal PWM control method/overmodulation PWM control method) is selected according to the flowchart shown in FIG. 3.

Control mode determination portion 300 calculates line voltage amplitude Vamp according to the following equations (1), (2), using d-axis voltage command value Vd# and q-axis voltage command value Vq# generated by PI calculation portion 240.

$$Vamp=|Vd\#|\cdot \cos\phi+|Vq\#|\cdot \sin\phi \quad (1)$$

$$\tan\phi=Vq\#/Vd\# \quad (2)$$

Furthermore, control mode determination portion 300 calculates modulation rate Kmd which is a ratio of line voltage amplitude Vamp based on the calculation above to system voltage VH, according to the following equation (3).

$$Kmd=Vamp/VH\# \quad (3)$$

Control mode determination portion 300 selects one of the sinusoidal PWM control method and the overmodulation PWM control method according to modulation rate Kmd obtained by the calculation above. Here, as described above, the selection of the control method by control mode determination portion 300 reflects on switching of a carrier wave in PWM signal generation portion 260. In other words, at a time of the overmodulation PWM control method, the carrier wave used in the PWM modulation in PWM signal generation portion 260 is switched from the general one in the sinusoidal PWM control method.

VH command value generation portion 310 generates control command value VH# of system voltage VH (also referred to as voltage command value VH# hereinafter) depending on torque command value Tqcom and revolutions Nmt of AC motor M1, according to the flowchart shown in FIG. 3.

PWM signal generation portion 350 generates switching control signals S1, S2, according to the prescribed PWM control method, so that the output voltage of converter 12 attains voltage command value VH#, based on battery voltage Vb detected by voltage sensor 10 and the current system voltage VH.

By employing such a configuration, feedback control of motor current (id, iq) is performed so that the output torque of AC motor M1 agrees with torque command value Tqcom. It is noted that, at a time of overmodulation PWM control method, in the conversion from the detected motor current (iv, iw) into d-axis current id, q-axis current iq by coordinate transformation portion 220, filter processing for removing a distortion component is executed together.

Now, using FIG. 6, a control block diagram at a time of rectangular wave control method will be described.

Figure 6:
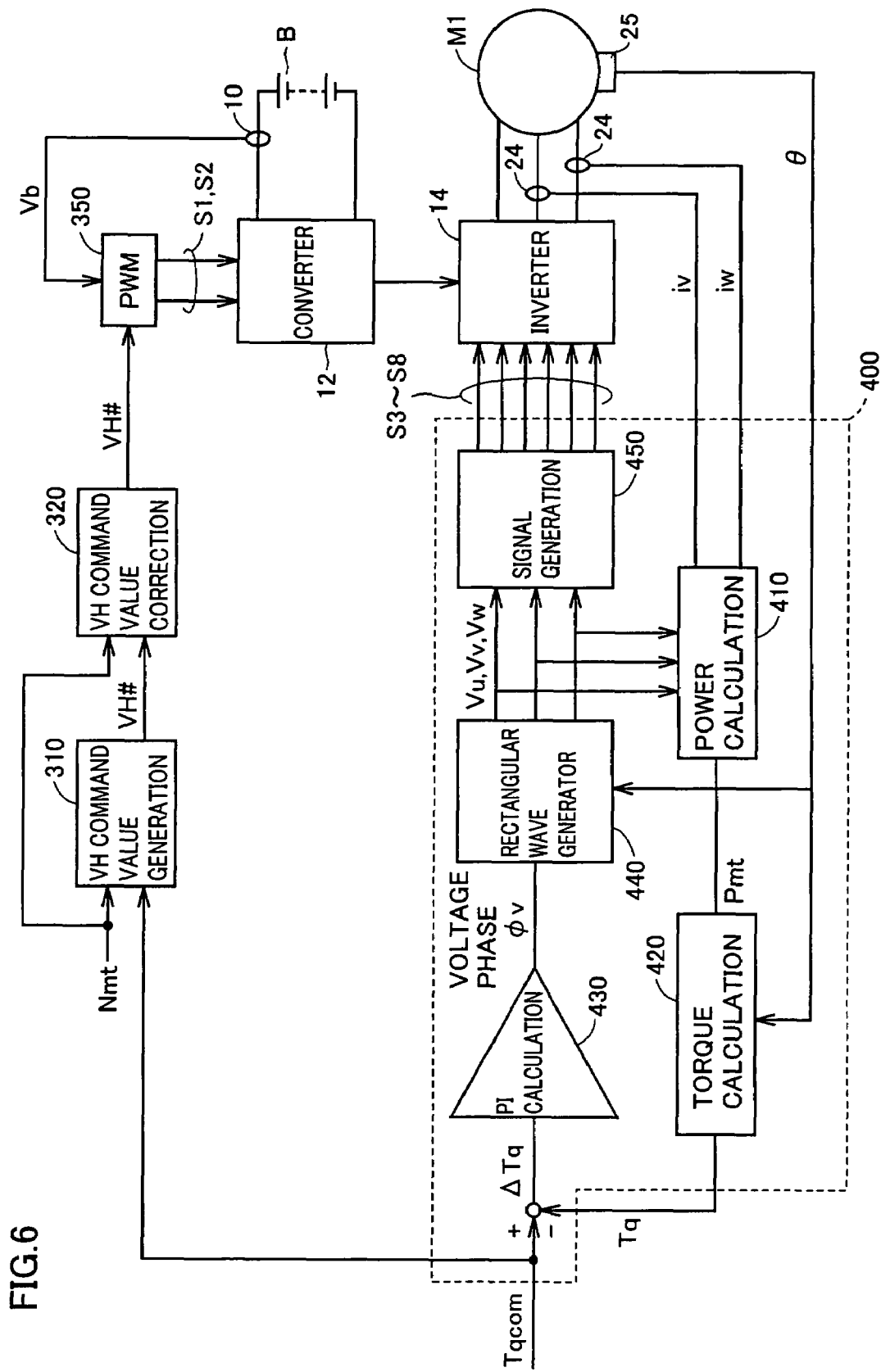
FIG. 6 is a control block diagram in the rectangular wave control method.

Referring to FIG. 6, a rectangular wave control block 400 includes a power calculation portion 410, a torque calculation portion 420, a PI calculation portion 430, a rectangular wave generator 440, and a signal generation portion 450. It is noted that the control block diagram shown in FIG. 6 is also implemented by a control calculation process according to a prescribed program executed by control device 30.

Power calculation portion 410 calculates supply power to the motor (motor current) Pmt according to the following equation (4) from each phase current obtained from V-phase current iv and W-phase current iw by current sensor 24 and each phase (U phase, V phase, W phase) voltage Vu, Vv, Vw.

$$Pmt=iu\cdot Vu+iv\cdot Vv+iw\cdot Vw \quad (4)$$

Torque calculation portion 420 calculates a torque estimation value Tq according to the following equation (5), using motor power Pmt obtained by power calculation portion 410 and angular speed ω calculated from rotational angle θ of AC motor M1 detected by rotational angle sensor 25.

$$Tq=Pmt/\omega \quad (5)$$

PI calculation portion 430 receives torque deviation ΔTq from torque command value Tqcom (ΔTq=Tqcom−Tq). PI calculation portion 430 performs PI calculation by a prescribed gain for torque deviation ΔTq to obtain a control deviation and sets phase φv of rectangular wave voltage depending on the obtained control deviation. Specifically, when positive torque is generated (Tqcom>0), the voltage phase is advanced at a time of insufficient torque while the voltage phase is delayed at a time of excessive torque. In addition, when negative torque is generated (Tqcom<0), the voltage phase is delayed at a time of insufficient torque while the voltage phase is advanced at a time of excessive torque.

Rectangular wave generator 440 generates each phase voltage command value (rectangular wave pulse) Vu, Vv, Vw according to voltage phase φv set by PI calculation portion 430. Signal generation portion 450 generates switching control signals S3-S8 according to each phase voltage command values Vu, Vv, Vw. Inverter 14 performs a switching operation according to switching control signals S3-S8 so that a rectangular wave pulse according to voltage phase φv is applied as each phase voltage of the motor.

In this manner, at a time of rectangular wave control method, motor torque control can be performed by the torque (power) feedback control. However, in the rectangular wave control method, the operation amount of the motor applied voltage is only the phase, and therefore the control response is degraded as compared with the PWM control method in which the amplitude and the phase of the motor applied voltage can be set as the operation amount. In addition, in the power calculation (equation (4)) in power calculation portion 410, filter processing is executed together for removing a distortion component from the detected motor current (iv, iw).

Figure 7:
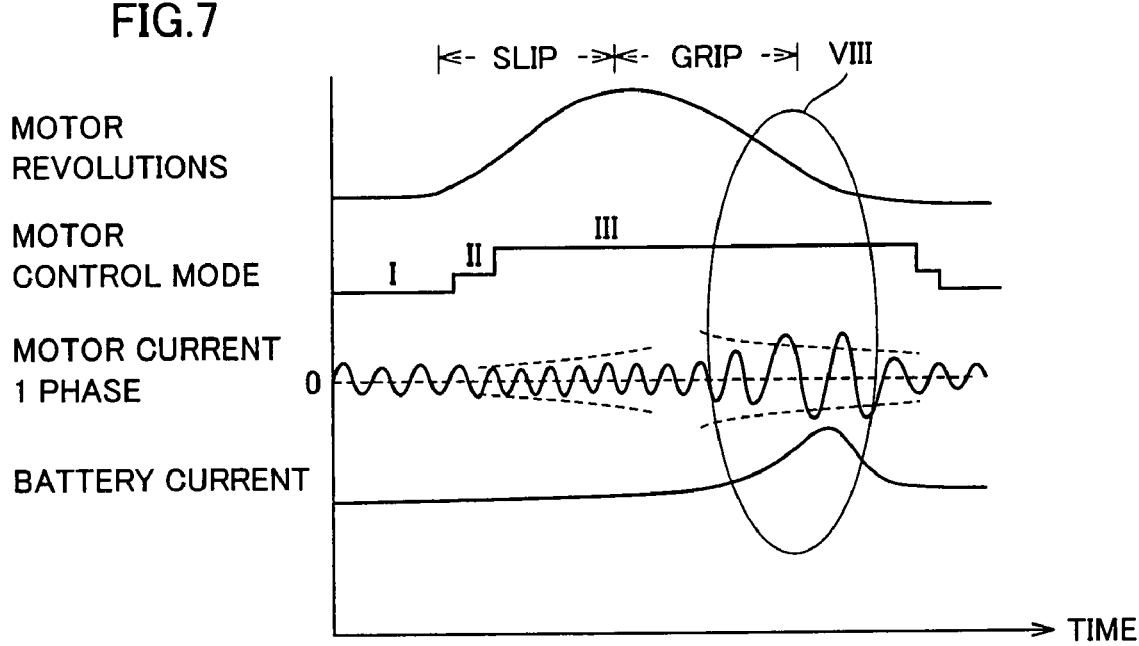
FIG. 7 is an operation waveform diagram illustrating occurrence of motor current disturbance at a time of a sudden change of the motor revolutions under the rectangular wave control method.

FIG. 7 is an operation waveform diagram illustrating occurrence of motor current disturbance at a time of a sudden change of the motor revolutions under the rectangular wave control method.

FIG. 7 shows an operation in a case where the suddenly changes of the motor revolutions in a state in which the motor control mode enters the rectangular wave control method (III) through the sinusoidal PWM method (I) and the overmodulation PWM method (II). Such a sudden change of the motor revolutions occurs, for example, in a hybrid car (electric vehicle) equipped with AC motor M1 as a vehicle driving motor, as a result of slippage or gripping of the wheels when the vehicle passes through a low μ road or a high μ road.

At a time of a sudden increase of the motor revolutions (at a time of slippage), although essentially, the motor current should be controlled to gradually increase, the motor applied voltage cannot be changed quickly due to the effect of control delay in the rectangular wave control method as described above, and it is difficult to allow the motor current to follow the desired state. On the contrary, at a time of a sudden decrease of the motor revolutions (at a time of slippage), although control should be performed such that the motor current is gradually decreased, current amplitude is likely to become excessive due to delay in motor controllability. In this case, the current output from DC power supply B (battery) is increased so that overcurrent/overvoltage may occur in the motor drive system.

Figure 8:
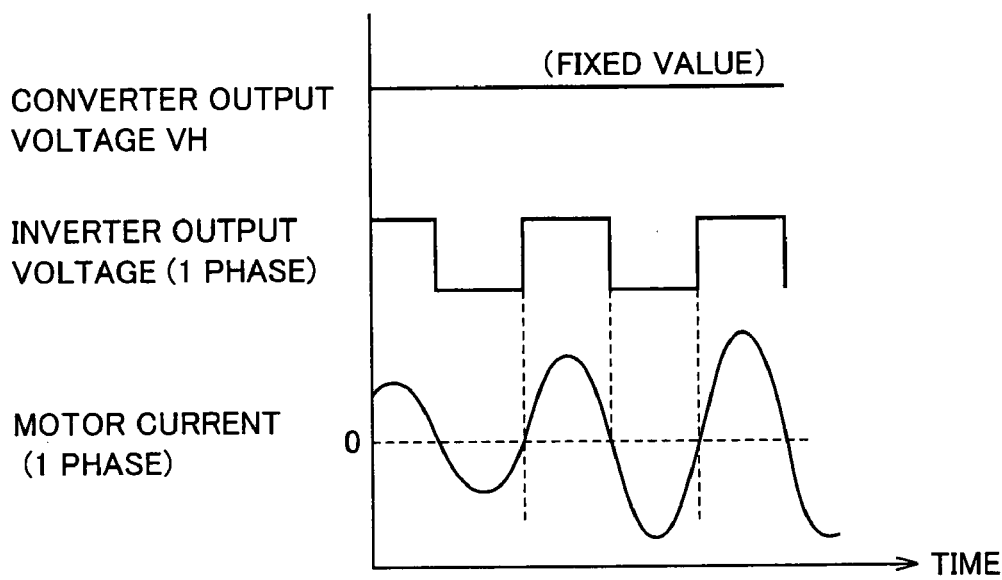
FIG. 8 is an enlarged diagram of VIII region in FIG. 7.

FIG. 8 shows an enlarged diagram of VIII region (a sudden decrease section of the motor revolutions) in FIG. 7 in order to detail the behavior of the motor current at a time of vehicle grip shown in FIG. 7.

Referring to FIG. 8, the inverter output voltage (that is, motor applied voltage) is basically rectangular wave-controlled under a constant system voltage (converter output voltage), so that, as a result of the low controllability, the amplitude of the motor current cannot follow the sudden change of the motor revolutions and is disturbed in the increasing direction.

In order to avoid the phenomenon shown in FIG. 8, in the control device for the motor drive system in accordance with the first embodiment, system voltage control as described below is performed by a VH command value correction portion 320 shown in FIG. 6.

Figure 9:
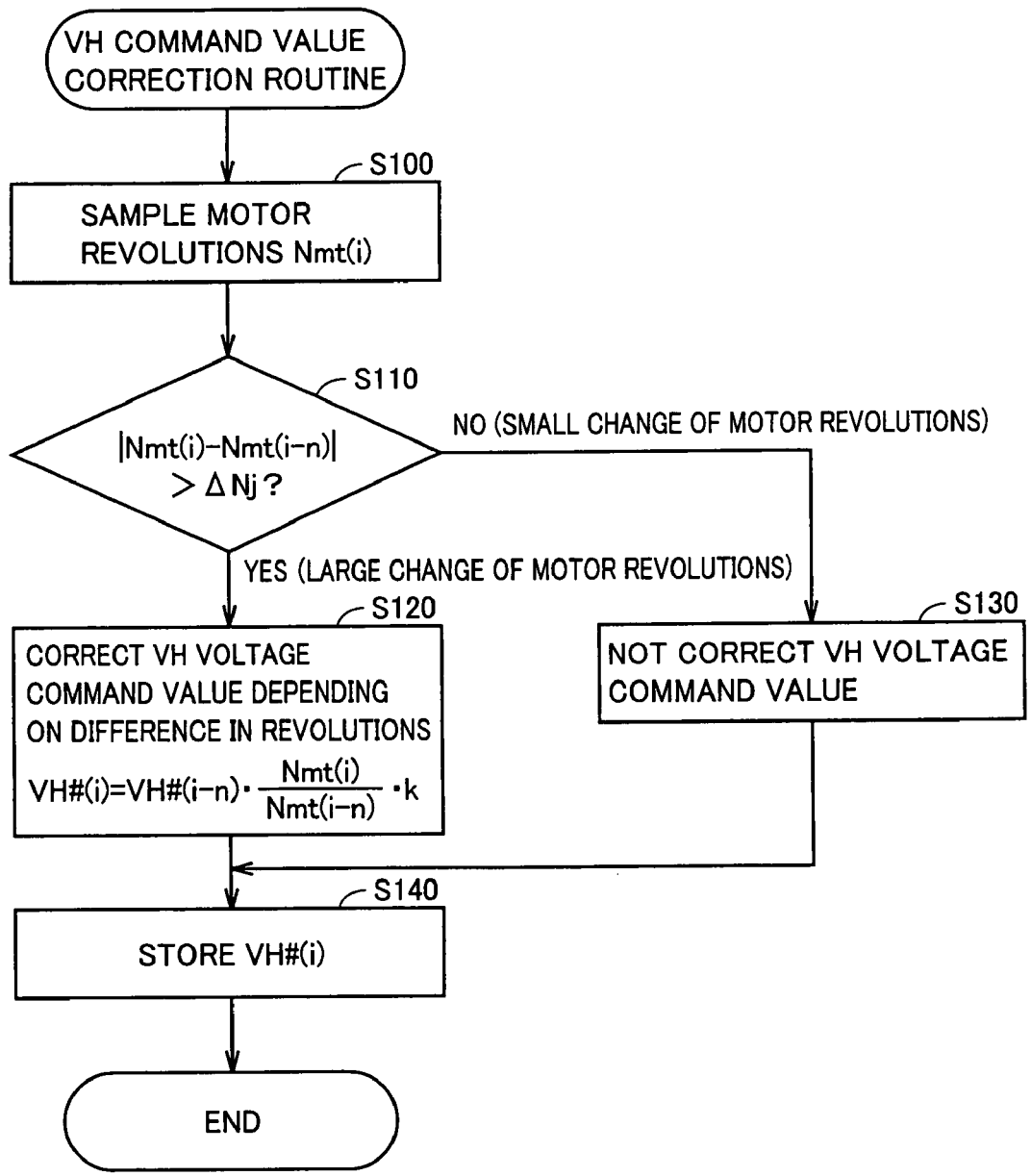
FIG. 9 is a flowchart illustrating system voltage control by a control device for a motor drive system in accordance with a first embodiment.

FIG. 9 is a flowchart illustrating the system voltage control by the control device for the motor drive system in accordance with the first embodiment.

Referring to FIG. 9, VH command value correction portion 320 samples motor revolutions Nmt (i) at that point of time in step S100. Then, in step S110, VH command value correction portion 320 senses a sudden change of the motor revolutions based on determination as to whether or not the difference between motor revolutions Nmt(i) sampled this time in step S100 and motor revolutions Nmt(i−n) at a time n samples earlier (n: a prescribed natural number) is larger than a prescribed determination value ΔNj. In other words, in step S110, it is determined whether or not the following equation (6) holds.

$$|Nmt(i)-Nmt(i-n)|>\Delta Nj \quad (6)$$

If NO is determined in step S110, that is, if a sudden change of the motor revolutions is not sensed, in step S130, voltage command value VH# generated by VH command value generation portion 310 is not corrected and is employed as it is as voltage command value VH# of converter 12.

On the other hand, if YES is determined in step S110, that is, if a sudden change of the motor revolutions is sensed, in step S120, VH command value correction portion 320 corrects VH voltage command value VH# depending on the change of revolutions according to the following equation (7).

$$VH\#(i) = VH\#(i-n) \cdot \frac{Nmt(i)}{Nmt(i-n)} \cdot k \quad (7)$$

In this manner, VH command value correction portion 320 corrects the command value of system voltage VH according to the ratio of the motor revolutions. Here, k in the equation (7) is adjustment coefficient (k>0). In addition, in step S140, VH command value correction portion 320 stores voltage command value VH# determined through step S120 or step S130 in preparation for the system voltage control n samples later.

Here, the relation between the variations of the motor revolutions and the motor voltage will be described.

As well known, the voltage equation on the d-axis and the q-axis in a synchronous motor is represented by the following equations (8), (9).

$$Vd=Ra \cdot id-\omega \cdot Lq \cdot iq \quad (8)$$

$$Vq=\omega \cdot Ld \cdot id+Ra \cdot iq+\omega \cdot \phi \quad (9)$$

Here, in the equations (8), (9), Ra represents armature winding resistance, ω represents the electrical angular speed, and φ represents the number of armature flux linkages. The voltage component dependent on the winding resistance contributes in a very low-speed region and the other components become dominant with increasing revolutions. Therefore, considering that the rectangular wave control method is used in the high-speed range (FIG. 2), the winding resistance component in the equations (8), (9) can be ignored. Thus, the equations (2), (3) as noted above are represented by the following equations (10), (11), at a time of rectangular wave control method. It is noted that the equations (10), (11) also hold at the time of overmodulation PWM control method used in the mid-speed range.

$$Vd=-\omega \cdot Lq \cdot iq \quad (10)$$

$$Vq=\omega \cdot Ld \cdot id+\omega \phi=\omega(Ld \cdot id+\phi) \quad (11)$$

Furthermore, electrical angular speed ω has the relation with motor revolutions Nmt as in the following equation (12).

$$\omega=2\pi \cdot f=2\pi \cdot (Nmt/60) \cdot p \quad (12)$$

Here, in the equation (12), f represents electric frequency (the reciprocal of a period corresponding to one phase of the input output voltage shown in FIG. 8), and p represents the number of pole pairs of AC motor M1.

The equations (10), (11) are substituted for the equation (12), resulting in the following equations (13), (14).

$$Vd=-2\pi \cdot (Nmt/60) \cdot p \cdot Lq \cdot iq \quad (13)$$

$$Vq=2\pi \cdot (Nmt/60) \cdot p \cdot (Ld \cdot id+\phi) \quad (14)$$

As can be understood from the equations (13), (14), d-axis voltage Vd and q-axis voltage Vq are proportional to motor revolutions Nmt. Therefore, as shown in the following equation (15), motor terminal voltage Vr (line voltage) is also proportional to motor revolutions Nmt.

$$Vr = \sqrt{(Vd^2+Vq^2)}=2\pi \cdot (Nmt/60) \cdot p \cdot \sqrt{Lq^2 iq^2+(Ld \cdot id+\phi)^2} \quad (15)$$

Therefore, at a time of a sudden change of the motor revolutions, voltage command value VH# of converter 12 is corrected by VH command value correction portion 320 as in the above-noted step S120, so that the inverter input voltage (that is, system voltage VH) is changed according to the ratio of revolutions. Therefore, the motor applied voltage can be reduced or increased according to the ratio of revolutions in a feed forward control manner, without waiting for the torque (power) feedback control based on the motor current with low control response.

Figure 10:
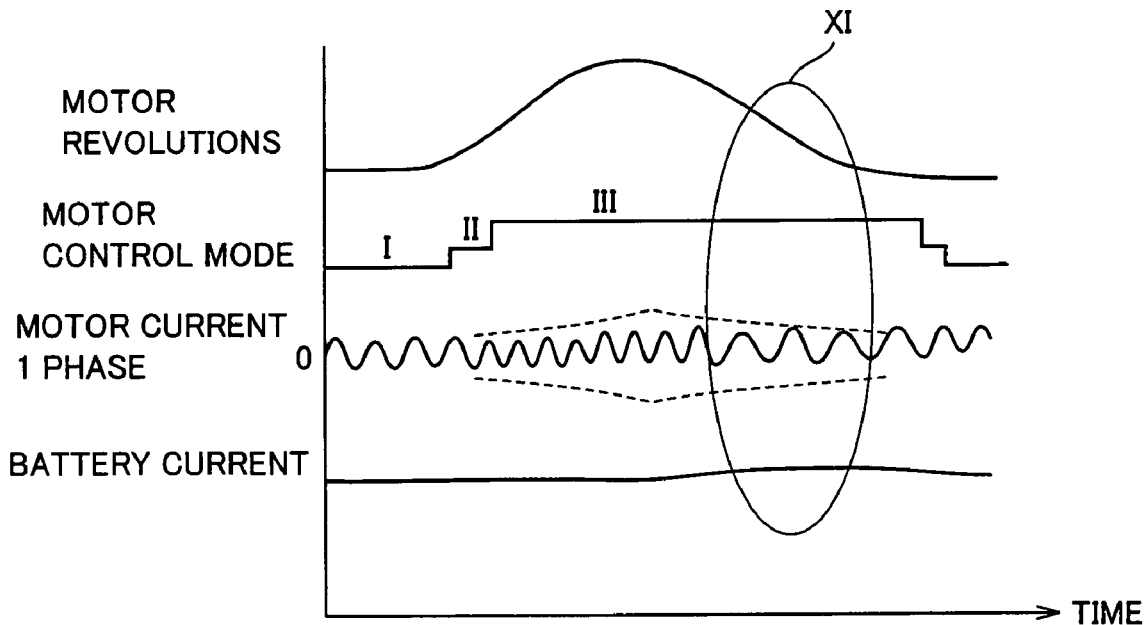
FIG. 10 is a diagram illustrating a control operation at a time of a sudden change of the motor revolutions by the control device for the motor drive system in accordance with the first embodiment.
Figure 11:
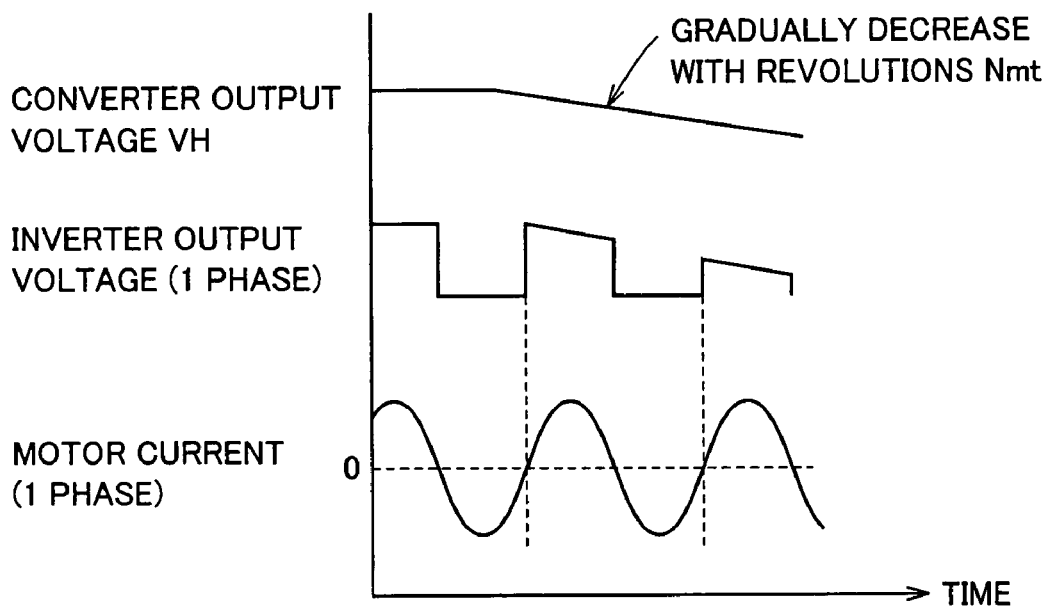
FIG. 11 is an enlarged diagram of XI region in FIG. 10.

FIG. 10 and FIG. 11 show the control operation at a time of a sudden change of the motor revolutions by the control device for the motor drive system in accordance with the first embodiment.

FIG. 10 shows an exemplary operation in which an increase of the motor current is prevented by performing the VH command value (VH#) correction control shown in FIG. 9 at a time of a sudden change of the motor revolutions under the same conditions as in FIG. 7.

FIG. 11 is an enlarged diagram showing transition of the converter output voltage, the inverter output voltage (motor applied voltage) and the motor current in XI region (a sudden decrease section of the motor revolutions) in FIG. 10.

Referring to FIG. 11, the inverter output voltage, that is, the motor applied voltage can be decreased by decreasing the converter output voltage (system) VH according to motor revolutions Nmt, according to the flowchart shown in FIG. 9. Thus, the motor current can be kept at a proper level without causing a divergence state resulting from the low response of the feedback control, even at a time of a sudden decrease of the motor revolutions.

Figure 12:
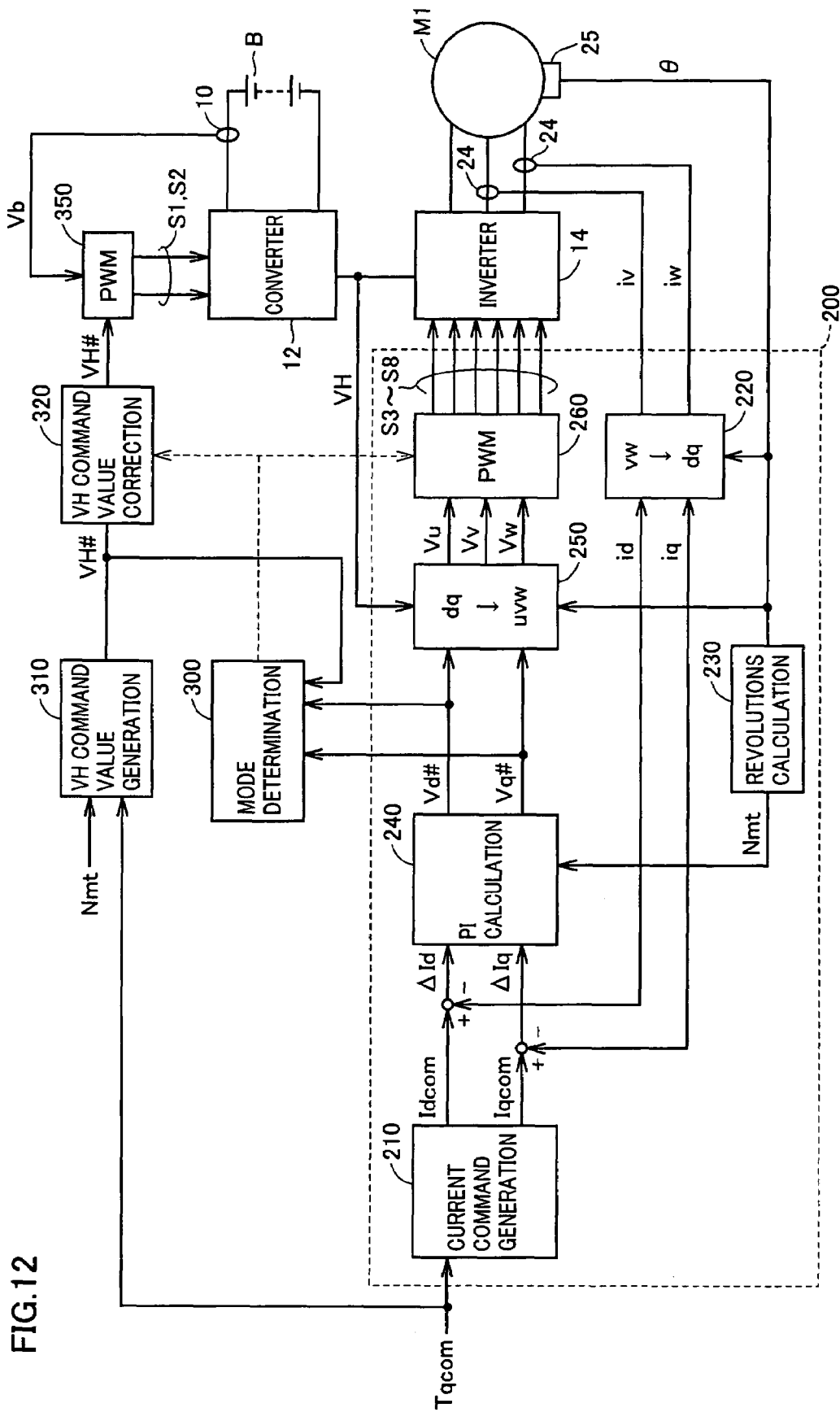
FIG. 12 is a control block diagram of the PWM control method by the control device for the motor drive system in accordance with the first embodiment.

It is noted that, as shown in FIG. 12, the converter output voltage control by VH command value correction portion 320 can also be used at a time of overmodulation control applied in the mid-speed range of AC motor M1. In other words, addition of VH command value correction portion 320 (FIG. 6) to the control configuration shown in FIG. 5 results in a control configuration in which the similar VH command value correction routine as in FIG. 9 is executed even at a time of application of the overmodulation control method so that the input voltage (system voltage VH) of inverter 14 is set in response to a sudden change of the motor revolutions.

By employing such a control configuration, even when the motor revolutions varies suddenly, occurrence of excessive motor current resulting from the reduced motor current controllability at a time of overmodulation control is prevented and the motor current can be kept at a proper level.

In this manner, the equipment such as the smoothing capacitor or the inverter can be protected, and in addition, the safety degree concerning the design of the rating (withstand voltage, current capacity, and the like) of the switching element forming the inverter can be reduced, thereby contributing to reduction of the manufacturing costs.

Furthermore, for adjustment coefficient k in the equation (7), different values can be set between at a time of a decrease of the motor revolutions (that is, when Nmt(i)−Nmt(i−n)<0) and at a time of an increase of the motor revolutions (that is, when Nmt(i)−Nmt(i−n)>0). In particular, adjustment coefficient k may be increased (in the vicinity of 1.0) to increase the correction degree of the motor applied voltage for a change of the motor revolutions, at a time of a decrease of the motor revolutions when the motor current is disturbed in the excessively increasing direction in terms of motor characteristics, while adjustment coefficient k may be reduced (for example, in the vicinity of zero) at a time of an increase of the motor revolutions when the control response is degraded in the motor current excessively decreasing direction.

Here, the correspondence between the control configuration of the motor drive system illustrated in the first embodiment and the configuration of the present invention will be described. In control device 30, the control method selecting function portion according to the flowchart shown in FIG. 3 corresponds to "control method selection means (portion)" of the present invention, and PWM control block 200 in FIG. 5 at a time of sinusoidal PWM control corresponds to "first motor control means (portion)" of the present invention. Furthermore, PWM control block 200 in FIG. 5 at a time of overmodulation PWM control and rectangular wave control block 400 in FIG. 6 correspond to "second motor control means (portion)" of the present invention.

In addition, step S110 in FIG. 9 corresponds to "rotational speed change detection means (portion)" of the present invention, and step S120 in FIG. 9 and VH command value correction portion 320 in FIG. 6 correspond to "motor voltage correction means (portion)" of the present invention.

Second Embodiment

In a second embodiment, a variation of the control configuration for solving the similar technical problem at a time of rectangular wave control method will be described. It is noted that the control configuration in accordance with the second embodiment corresponds to the time of a decrease of the motor revolutions when the motor current is disturbed in the excessively increasing direction.

Figure 13:
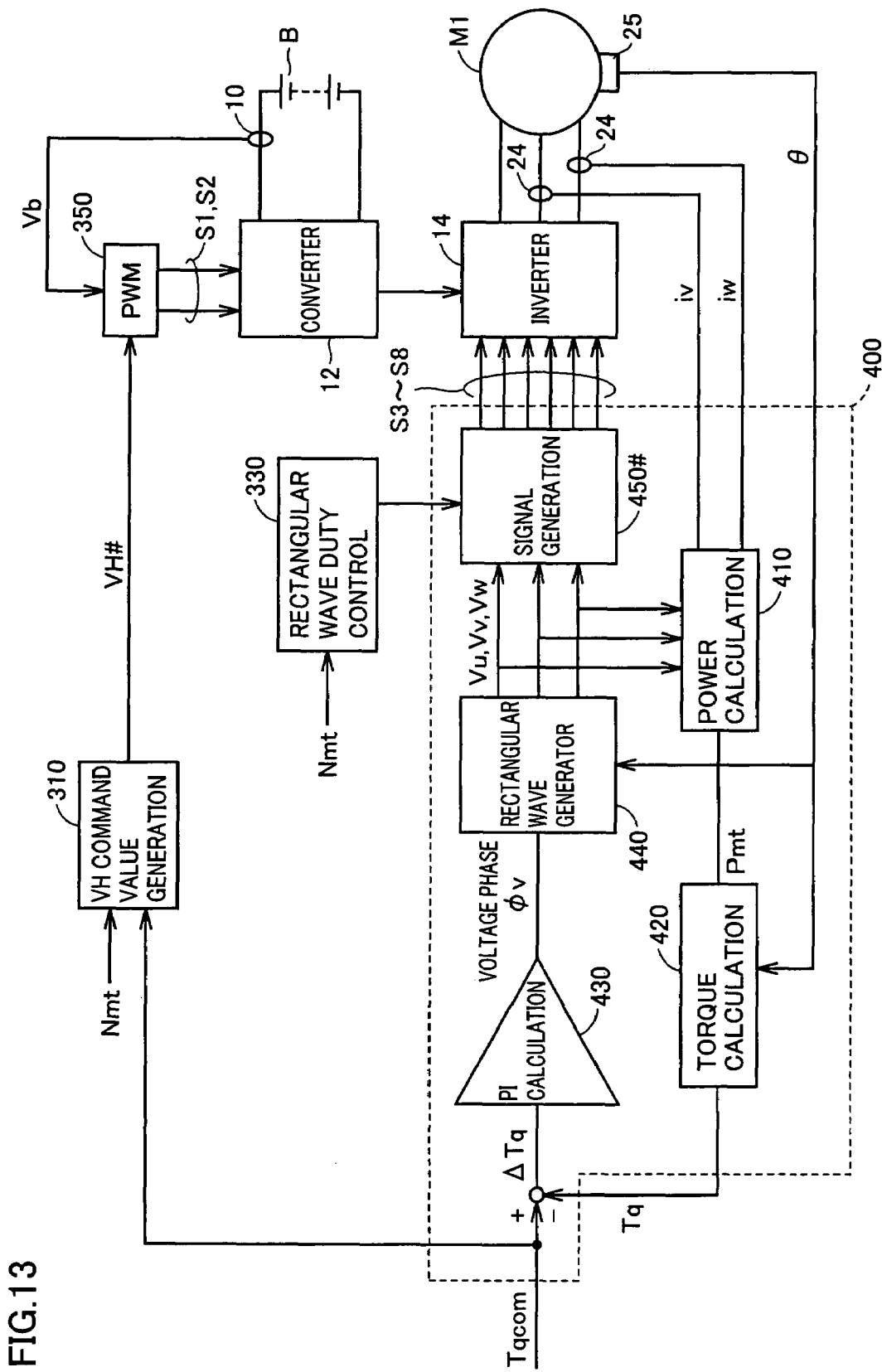
FIG. 13 is a control block diagram of the rectangular wave control by the control device for the motor drive system in accordance with a second embodiment.

FIG. 13 is a control block diagram of the rectangular wave control by the control device for the motor drive system in accordance with the second embodiment.

In FIG. 13, in comparison with FIG. 6, in the rectangular wave control configuration in accordance with the second embodiment, a rectangular wave duty control portion 330 is additionally provided to the control configuration shown in FIG. 6. The configuration in the other parts is similar to that of FIG. 6 and therefore the detailed description will not be repeated.

Rectangular wave duty control portion 330 controls the motor applied voltage at a time of the rectangular wave control method depending on motor revolutions Nmt, as described below.

Figure 14:
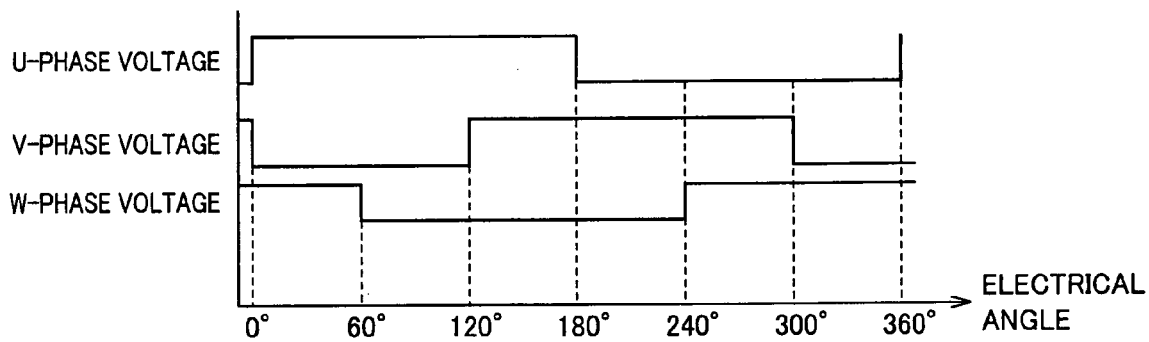
FIG. 14 is a waveform diagram showing each phase motor voltage in normal times at a time of the rectangular wave control method.

As shown in FIG. 14, in the normal rectangular wave control, U-phase, V-phase and W-phase motor applied voltages have rectangular waves with electrical angles shifted from each other by 120°. Then, with the phase difference of 120° between each phase being kept, the entire voltage phase changes with voltage phase φv (FIG. 6, FIG. 13).

Figure 15:
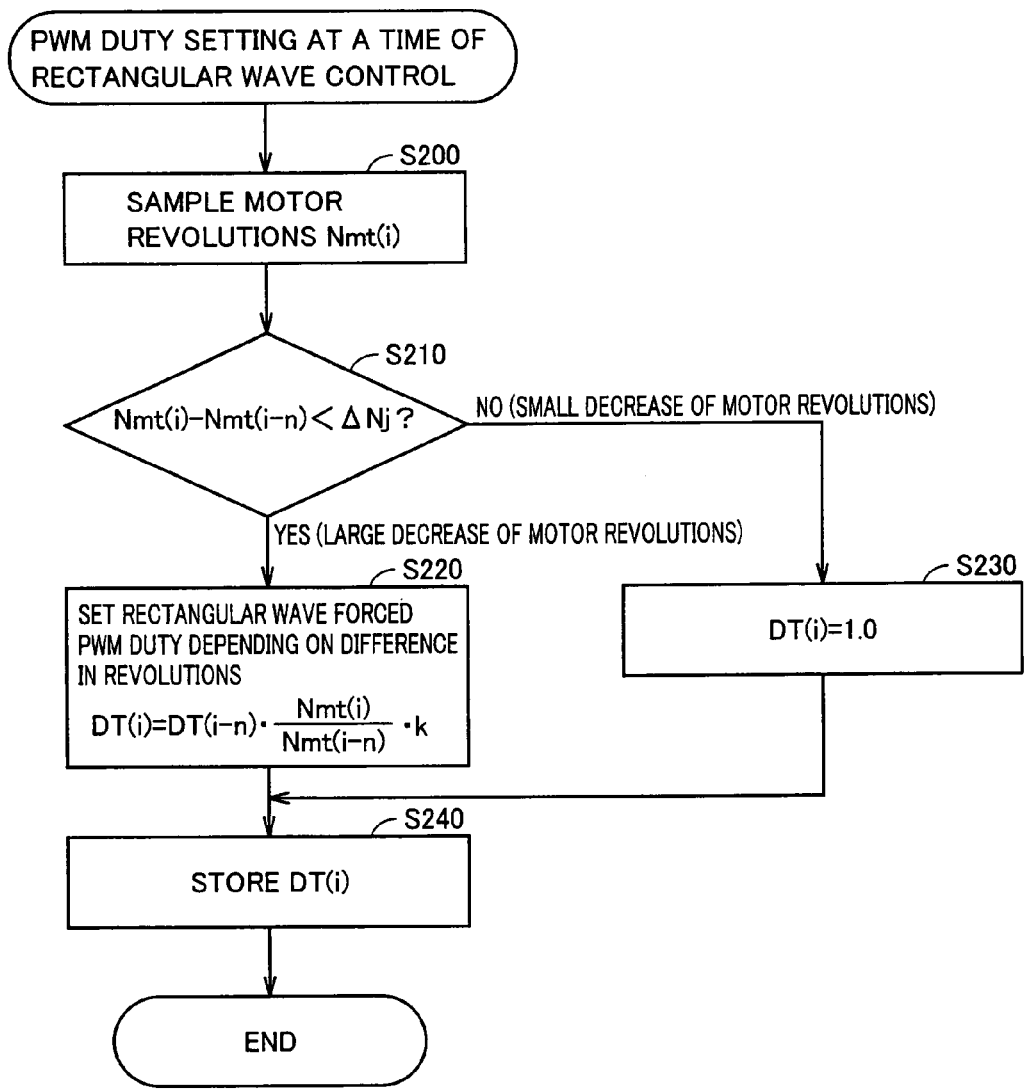
FIG. 15 is a flowchart illustrating an operation of a rectangular wave duty control portion shown in FIG. 13.

FIG. 15 is a flowchart illustrating the operation of rectangular wave duty control portion 330.

Referring to FIG. 15, in step S200, rectangular wave duty control portion 330 samples motor revolutions Nmt(i) at that point of time. In addition, in step S210, rectangular wave duty control portion 330 senses a rapid decrease of the motor revolutions based on the determination as to whether or not motor revolutions Nmt(i) sampled this time in step S100 exceeds prescribed determination value ΔNj as compared with motor revolutions Nmt(i−n) at a time n samples earlier (n: a prescribed natural number). In other words, in step S210, it is determined whether or not the following equation (16) holds.

$$Nmt(i)-Nmt(i-n)<\Delta Nj \qquad (16)$$

If NO is determined in step S210, that is, if a sudden change of the motor revolutions is not sensed, in step S230, rectangular wave duty ratio DT(i)=1.0 is set, and the rectangular wave voltage shown in FIG. 13 is applied to AC motor M1 according to the normal rectangular wave control method.

On the other hand, if YES is determined in step S210, that is, if a sudden decrease of the motor revolutions is sensed, in step S220, rectangular wave duty control portion 330 sets rectangular wave duty ratio DT(i) to be smaller than 1.0, depending on the change of revolutions, according to the following equation (17).

$$DT(i) = DT(i-n) \cdot \frac{Nmt(i)}{Nmt(i-n)} \cdot k \tag{17}$$

Adjustment coefficient k (k>0) in the equation (17) can be set as appropriate. Furthermore, in step S240, rectangular wave duty ratio DT(i) corresponding to motor revolutions Nmt(i), which is determined through step S220 or S230, is stored in preparation for the control n samples later.

Figure 16:
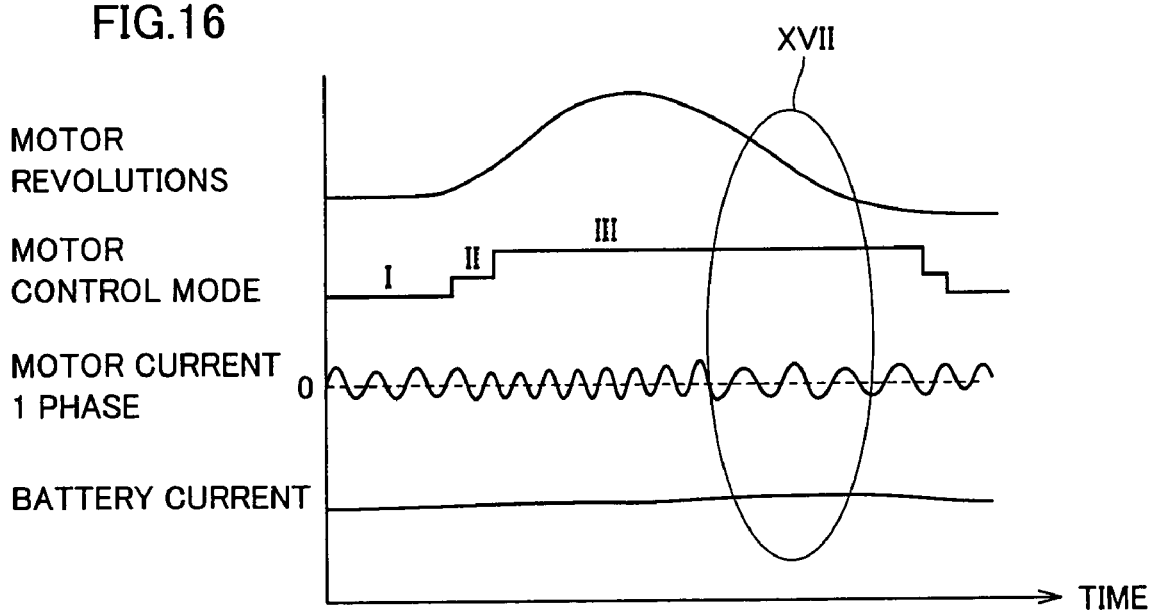
FIG. 16 is a diagram illustrating a control operation at a time of a sudden decrease of the motor revolutions under the rectangular wave control method by the control device for the motor drive system in accordance with the second embodiment.
Figure 17:
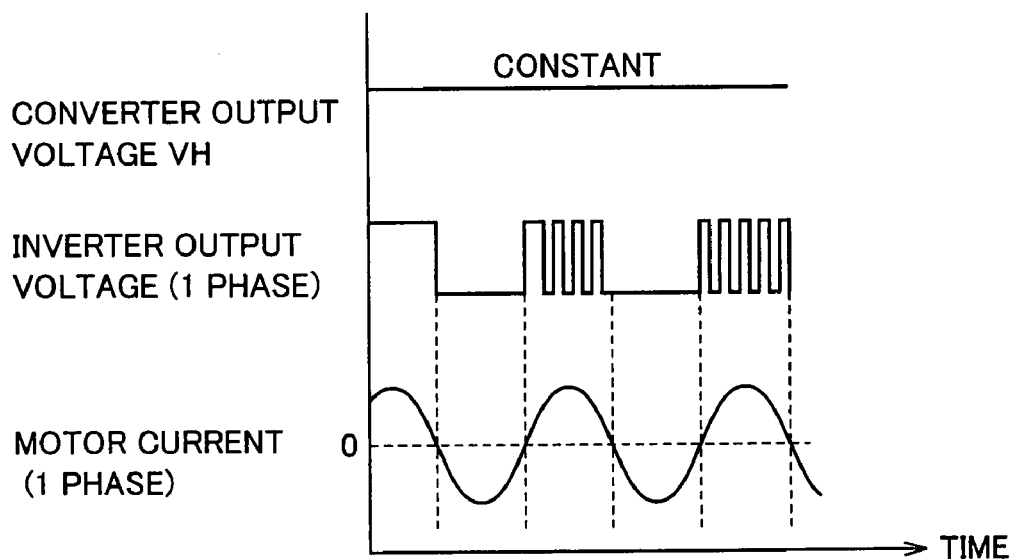
FIG. 17 is an enlarged diagram of XVII region in FIG. 16.

FIG. 16 and FIG. 17 show the control operation at a time of a sudden change of the motor revolutions under the rectangular wave control method by the control device for the motor drive system in accordance with the second embodiment.

FIG. 16 shows an exemplary operation in which an increase of the motor current is prevented by the aforementioned rectangular wave forced PWM control at a time of a sudden change of the motor revolutions under the same conditions as in FIG. 7. FIG. 17 is an enlarged diagram showing transition of the converter output voltage, the inverter output voltage (motor applied voltage) and the motor current in XVII region (a sudden decrease section of the motor revolutions in FIG. 16.

As shown in FIG. 17, at a time of a sudden decrease of the motor revolutions, such PWM control is performed in that duty ratio DT(i) depending on the change of motor revolutions is forcedly provided in each phase voltage which is essentially a rectangular wave. Thus, when the motor revolutions suddenly decreases, the average value of the motor applied voltage at a time of rectangular wave control can be reduced according to the ratio of motor revolutions. Therefore, similar to the first embodiment, excessive divergence of the motor current can be prevented.

It is noted that in the configuration illustrated in the second embodiment, step S220 in FIG. 15 and rectangular wave duty control portion 330 in FIG. 13 correspond to "motor voltage correction means (portion)" of the present invention.

Third Embodiment

In a third embodiment, a variation of the control configuration for solving the similar technical problem at a time of overmodulation PWM control method will be described.

Figure 18:
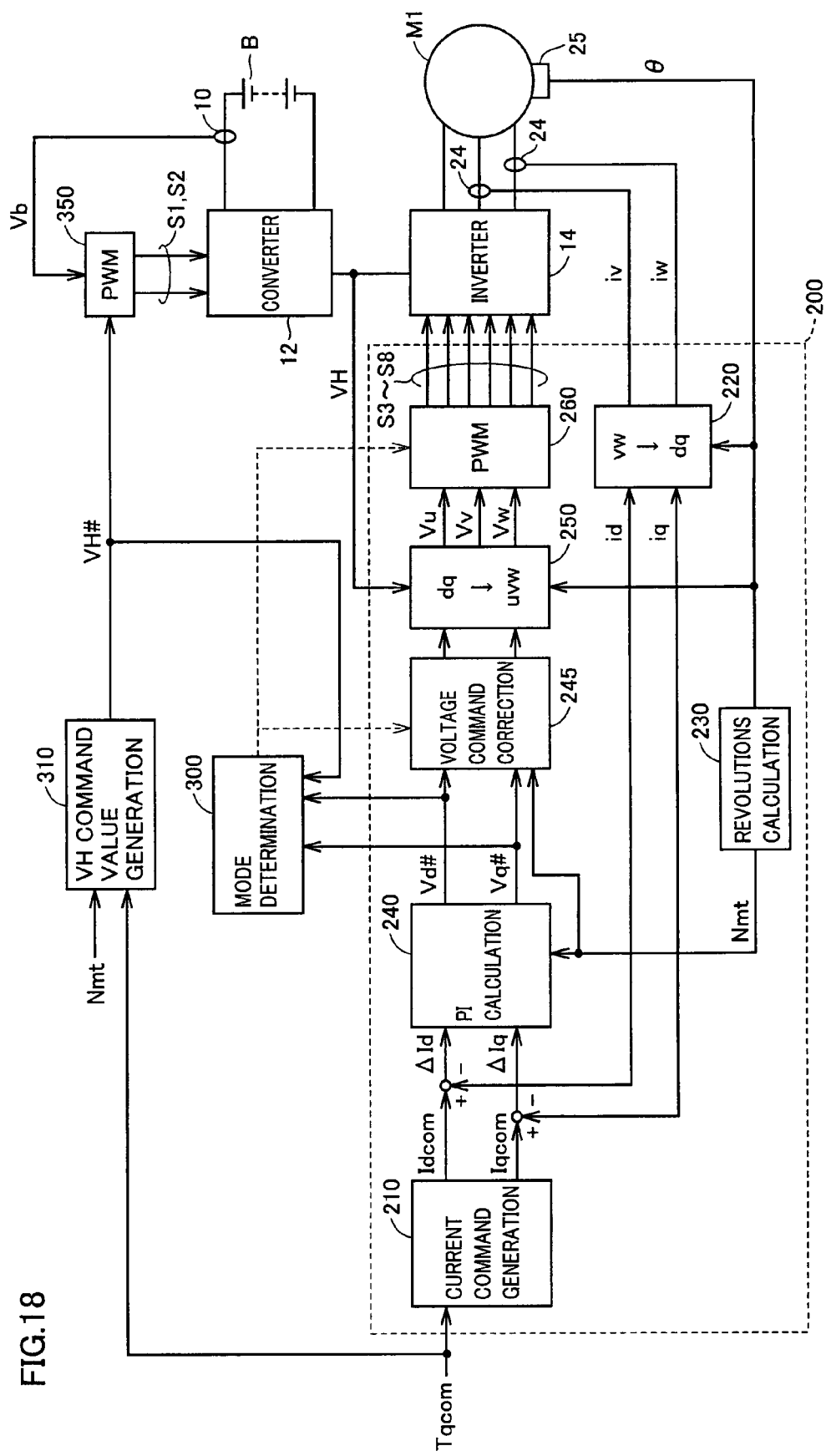
FIG. 18 is a control block diagram of the PWM control by the control device for the motor drive system in accordance with a third embodiment.

FIG. 18 is a control block diagram of PWM control by the control device for the motor drive system in accordance with the third embodiment.

In FIG. 18, in comparison with FIG. 5, in the control configuration in accordance with the third embodiment, a voltage command correction portion 245 used at a time of overmodulation control mode is additionally provided in PWM control block 200. The configuration in the other parts is similar to that of FIG. 5 and therefore the detailed description will not be repeated.

Figure 19:
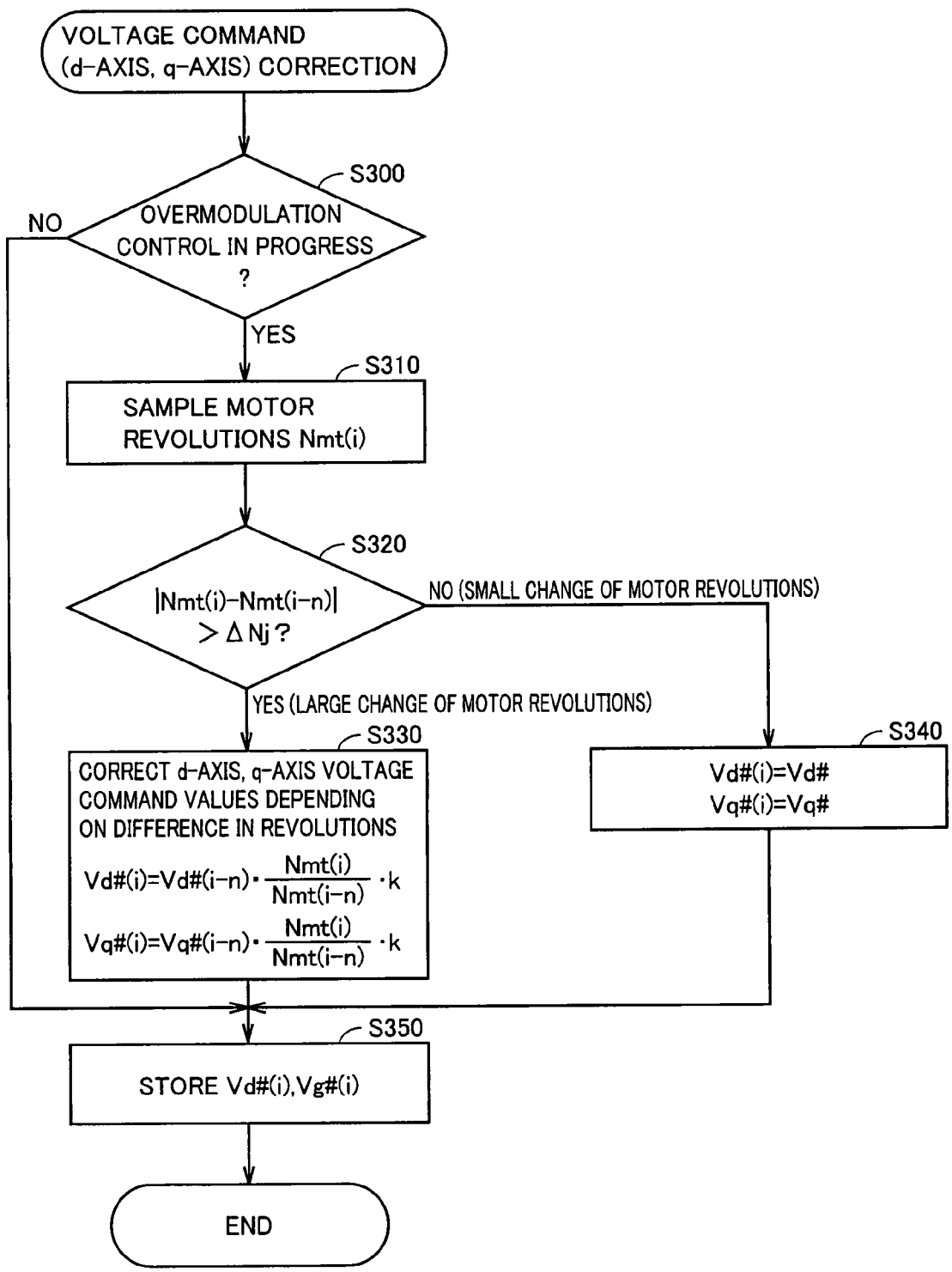
FIG. 19 is a flowchart illustrating an operation of a voltage command correction portion shown in FIG. 18.

FIG. 19 is a flowchart illustrating the operation of voltage command correction portion 245.

Referring to FIG. 19, in step S300, voltage command correction portion 245 determines whether overmodulation control is in progress or not, based on the output of control mode determination portion 300. If overmodulation control is not in progress (when NO is determined in step S300), voltage command correction by voltage command correction portion 245 is not executed.

When overmodulation control is in progress, that is, when YES is determined in step S300, voltage command correction portion 245 samples motor revolutions Nmt(i) at that point of time, in step S310. Furthermore, in step S320, voltage command correction portion 245 senses a sudden change of the motor revolutions based on the determination as to whether or not the difference between motor revolutions Nmt(i) sampled this time in step S310 and motor revolutions Nmt(i−n) at a time n samples earlier (n: a prescribed natural number) is larger than prescribed determination value ΔNj. In other words, the similar equation (6) as in step S110 is determined.

If NO is determined in step S320, that is, if a sudden change of the motor revolutions is not sensed, in step S340, voltage command values Vd# (d-axis) and Vq# (q-axis) generated by PI calculation portion 240 are output, without being corrected, as motor applied voltage command values to coordinate transformation portion 250.

On the other hand, if YES is determined in step S320, that is, if a sudden change of the motor revolutions is sensed, in step S330, voltage command correction portion 245 corrects voltage command values Vd# (d-axis) and Vq# (q-axis) depending on the change of revolutions according to the following equations (18), (19), and then outputs the corrected values as motor applied voltage command values to coordinate transformation portion 250.

$$Vd\#(i) = Vd\#(i-n) \cdot \frac{Nmt(i)}{Nmt(i-n)} \cdot k \tag{18}$$

$$Vq\#(i) = Vq\#(i-n) \cdot \frac{Nmt(i)}{Nmt(i-n)} \cdot k \tag{19}$$

By the equations (18), (19), the d-axis and q-axis voltage command values are corrected depending on a variation ratio of the motor revolutions, so that the motor applied voltage can be changed with the change of revolutions.

It is noted that adjustment coefficient k (k>0) in the equations (18), (19) can also be set similar to the adjustment coefficient in the equation (7). In other words, adjustment coefficient k may be increased (in the vicinity of 1.0) to increase the correction degree of the motor applied voltage for a change of the motor revolutions, at a time of a decrease of the motor revolutions when the motor current is disturbed in the excessively increasing direction, while adjustment coefficient k may be decreased (for example, in the vicinity of zero) at a time of an increase of the motor revolutions when the control response is degraded in the motor current excessively decreasing direction.

In addition, in step S350, the d-axis and q-axis voltage command values Vd#(i), Vq#(i) corresponding to motor revolutions Nmt(i), which are determined through step S330 or step S340, are stored in preparation for the control n samples later.

By employing such a configuration, the motor applied voltage can be changed with the ratio of the motor revolutions, in response to a sudden change of the motor revolutions under overmodulation control. Thus, excessive divergence of the motor current can be prevented, similarly to the first embodiment.

It is noted that, in the configuration illustrated in the third embodiment, step S330 in FIG. 19 and voltage command correction portion 245 in FIG. 18 correspond to "motor voltage correction means (portion)" of the present invention.

In the first to third embodiments, as a preferable exemplary configuration, DC voltage generation portion 10# of the motor drive system includes step-up/down converter 12 so that the input voltage to inverter 14 (system voltage VH) can be variably controlled. However, in the second and third embodiments, it is not essential that the inverter input voltage is variable, and the present invention is also applicable to a configuration in which the input voltage to inverter 14 is fixed (for example, the arrangement of step-up/down converter 12 is eliminated). In addition, also in the first embodiment, DC voltage generation portion 10# is not limited to the configuration illustrated in the present embodiment as long as the input voltage to inverter 14 can be variably controlled. Furthermore, as for the AC motor which is a load of the motor drive system, a permanent magnet motor has been illustrated in the present embodiment, although the present invention is applicable to a configuration in which an arbitrary AC motor is set as a load.

In addition, in step S110 (FIG. 9) and S320 (FIG. 19) of detecting a sudden change of the motor revolutions, a common determination value is used both at a time of increase and at a time of decrease of the motor revolutions by comparing the absolute value of the difference in motor revolutions with the determination value according to the equation (6). However, in application of the present invention, the respective determination values different between at a time of increase and at a time of decrease of the motor revolutions may be provided in these steps. In this case, it is preferable that the determination value is set to a relatively small value at a time of decrease of the motor revolutions when the motor current is disturbed in the excessively increasing direction.

The embodiments disclosed herein should be understood as being illustrative rather than being limitative in all respects. The scope of the present invention is not shown in the foregoing description but in the claims, and equivalents to the claims and all the modifications within the scope are intended to be embraced.

The invention claimed is:

1. A control device for a motor drive system including an inverter converting DC voltage into AC voltage for driving an AC motor, comprising:
    current detection means for detecting motor current supplied to said AC motor;
    rotational speed detection means for detecting a rotational speed of said AC motor;
    control method selection means for selectively setting a control method of voltage conversion in said inverter, depending on an operation condition of said AC motor;
    first motor control means for performing torque control based on said motor current detected by said current detection means, when said control method selection means selects a first control method in which an applied voltage to said AC motor is controlled according to a sinusoidal pulse width modulation method by vector control;
    second motor control means for performing torque control based on said motor current detected by said current detection means, when said control method selection means selects a second control method in which an application voltage to said AC motor is controlled according to a modulation method of outputting a voltage with a fundamental component larger than said sinusoidal pulse width modulation method;
    rotational speed change occurrence detection means for detecting that a rotational speed change of a prescribed value or greater occurs in said AC motor, during selection of said second control method, based on an output of said rotational speed detection means; and
    motor voltage correction means, when occurrence of a rotational speed change of said prescribed value or greater is detected by said rotational speed change occurrence detection means, for correcting the applied voltage to said AC motor by said second motor control means by a correction amount corresponding to a degree of said rotational speed change.

2. The control device for a motor drive system according to claim 1, wherein
    said motor drive system further includes a converter variably controlling a level of said DC voltage input to said inverter according to a voltage command value, and
    said motor voltage correction means includes means, when occurrence of a rotational speed change of said prescribed value or greater is detected by said rotational speed change occurrence detection means, for setting said voltage command value of said converter based on a correction amount corresponding to a degree of said rotational speed change.

3. The control device for a motor drive system according to claim 2, wherein said motor voltage correction means sets a correction degree of the applied voltage to said AC motor for said rotational speed change at a time of a rotational speed decrease of said AC motor to be larger than said correction degree at a time of a rotational speed increase of said AC motor.

4. The control device for a motor drive system according to claim 1, wherein
    said second motor control means includes rectangular wave control means for controlling switching of said inverter such that a rectangular wave voltage having as an amplitude said DC voltage input to said inverter is applied to said AC motor and said rectangular wave voltage has a phase corresponding to a torque deviation from a torque command value, and
    said motor voltage correction means includes means, when a rotational speed decrease of said prescribed value or greater is detected by said rotational speed change occurrence detection means, for controlling switching of said inverter such that a duty ratio corresponding to said rotational speed change is forcedly provided in said rectangular wave voltage.

5. The control device for a motor drive system according to claim 1, wherein
    said second motor control means includes
    calculation means for generating a voltage command value of the applied voltage to said AC motor depending on a deviation of said motor current from a current command value corresponding to said torque command value, and
    pulse width modulation means for controlling switching of said inverter according to said voltage command value, and
    said motor voltage correction means includes means, when occurrence of a rotational speed change of said prescribed value or greater is detected by said rotational speed change occurrence detection means, for correcting said voltage command value generated by said calculation means depending on said rotational speed change and transmitting the corrected voltage command value to said pulse width modulation means.

6. The control device for a motor drive system according to claim 5, wherein said motor voltage correction means sets a correction degree of the applied voltage to said AC motor for said rotational speed change at a time of a rotational speed decrease of said AC motor to be larger than said correction degree at a time of a rotational speed increase of said AC motor.

7. The control device for a motor drive system according to claim 1, wherein said motor voltage correction means sets a correction degree of the applied voltage to said AC motor for said rotational speed change at a time of a rotational speed decrease of said AC motor to be larger than said correction degree at a time of a rotational speed increase of said AC motor.

8. The control device for a motor drive system according to claim 1, wherein said motor voltage correction means corrects, when occurrence of a rotational speed change of said prescribed value or more is detected, the applied voltage to said AC motor by said second motor control means according to a ratio of rotational speed between before and after said rotational speed change.

9. A control device for a motor drive system including an inverter converting DC voltage into AC voltage for driving an AC motor, comprising:
    a current detection portion detecting motor current supplied to said AC motor;
    a rotational speed detection portion detecting a rotational speed of said AC motor;
    a control method selection portion selectively setting a control method of voltage conversion in said inverter, depending on an operation condition of said AC motor;
    a first motor control portion performing torque control based on said motor current detected by said current detection portion, when said control method selection portion selects a first control method in which an applied voltage to said AC motor is controlled according to a sinusoidal pulse width modulation method by vector control;
    a second motor control portion performing torque control based on said motor current detected by said current detection portion, when said control method selection portion selects a second control method in which the applied voltage to said AC motor is controlled according to a modulation method of outputting a voltage with a fundamental component larger than said sinusoidal pulse width modulation method;
    a rotational speed change occurrence detection portion detecting that a rotational speed change of a prescribed value or greater occurs in said AC motor, during selection of said second control method, based on an output of said rotational speed detection portion; and
    a motor voltage correction portion, when occurrence of a rotational speed change of said prescribed value or greater is detected by said rotational speed change occurrence detection portion, correcting the applied voltage to said AC motor by said second motor control portion by a correction amount corresponding to a degree of said rotational speed change.

10. The control device for a motor drive system according to claim 9, wherein
    said motor drive system further includes a converter variably controlling a level of said DC voltage input to said inverter according to a voltage command value, and
    said motor voltage correction portion is configured, when occurrence of a rotational speed change of said prescribed value or greater is detected by said rotational speed change occurrence detection portion, to set said voltage command value of said converter based on a correction amount corresponding to a degree of said rotational speed change.

11. The control device for a motor drive system according to claim 10, wherein said motor voltage correction portion sets a correction degree of the applied voltage to said AC motor for said rotational speed change at a time of a rotational speed decrease of said AC motor to be larger than said correction degree at a time of a rotational speed increase of said AC motor.

12. The control device for a motor drive device according to claim 9, wherein
    said second motor control portion includes a rectangular wave control portion controlling switching of said inverter such that a rectangular wave voltage having as an amplitude said DC voltage input to said inverter is applied to said AC motor and said rectangular wave voltage has a phase corresponding to a torque deviation from a torque command value, and
    said motor voltage correction portion is configured, when a rotational speed decrease of said prescribed value or greater is detected by said rotational speed change occurrence detection portion, to control switching of said inverter such that a duty ratio corresponding to said rotational speed change is forcedly provided in said rectangular wave voltage.

13. The control device for a motor drive system according to claim 9, wherein
    said second motor control portion includes
    a calculation portion generating a voltage command value of the applied voltage to said AC motor depending on a deviation of said motor current from a current command value corresponding to said torque command value, and
    a pulse width modulation portion controlling switching of said inverter according to said voltage command value, and
    said motor voltage correction portion is configured, when occurrence of a rotational speed change of said prescribed value or greater is detected by said rotational speed change occurrence detection portion, to correct said voltage command value generated by said calculation portion depending on said rotational speed change and transmitting the corrected voltage command value to said pulse width modulation portion.

14. The control device for a motor drive system according to claim 13, wherein said motor voltage correction portion sets a correction degree of the applied voltage to said AC motor for said rotational speed change at a time of a rotational speed decrease of said AC motor to be larger than said correction degree at a time of a rotational speed increase of said AC motor.

15. The control device for a motor drive system according to claim 9, wherein said motor voltage correction portion sets a correction degree of the applied voltage to said AC motor for said rotational speed change at a time of a rotational speed decrease of said AC motor to be larger than said correction degree at a time of a rotational speed increase of said AC motor.

16. The control device for a motor drive system according to claim 9, wherein said motor voltage correction means corrects, when occurrence of a rotational speed change of said prescribed value or more is detected, the applied voltage to said AC motor by said second motor control means according to a ratio of rotational speed between before and after said rotational speed change.

17. An electric vehicle comprising:
    an AC motor configured to generate torque for driving a drive wheel;
    a motor drive system configured to include an inverter converting DC voltage into AC voltage for driving said AC motor; and
    a control device for controlling said motor drive system,
    said control device including
    a current detection portion detecting motor current supplied to said AC motor, a rotational speed detection portion detecting a rotational speed of said AC motor, a control method selection portion selectively setting a control method of voltage conversion in said inverter, depending on an operation condition of said AC motor, a first motor control portion performing torque control based on said motor current detected by said current detection portion, when said control method selection portion selects a first control method in which an applied voltage to said AC motor is controlled according to a sinusoidal pulse width modulation method by vector control, a second motor control portion performing torque control based on said motor current detected by said current detection portion, when said control method selection portion selects a second control method in which the applied voltage to said AC motor is controlled according to a modulation method of outputting a voltage with a fundamental component larger than said sinusoidal pulse width modulation method, a rotational speed change occurrence detection portion detecting that a rotational speed change of a prescribed value or greater occurs in said AC motor, during selection of said second control method, based on an output of said rotational speed detection portion, and a motor voltage correction portion, when occurrence of a rotational speed change of said prescribed value or greater is detected by said rotational speed change occurrence detection portion, correcting the applied voltage to said AC motor by said second motor control portion by a correction amount corresponding to a degree of said rotational speed change.

18. The electric vehicle according to claim 17, wherein, said motor voltage correction means corrects, when occurrence of a rotational speed change of said prescribed value or more is detected, the applied voltage to said AC motor by said second motor control means according to a ratio of rotational speed before and after said rotational speed change.

* * * * *